(12) United States Patent
Matsuda et al.

(10) Patent No.: US 11,747,054 B2
(45) Date of Patent: Sep. 5, 2023

(54) MAGNETIC REFRIGERATOR

(71) Applicant: Mitsubishi Electric Corporation, Tokyo (JP)

(72) Inventors: Tetsuya Matsuda, Tokyo (JP); Shun Tonooka, Tokyo (JP); Atsushi Ogasahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/923,602

(22) PCT Filed: May 14, 2020

(86) PCT No.: PCT/JP2020/019338
§ 371 (c)(1),
(2) Date: Nov. 7, 2022

(87) PCT Pub. No.: WO2021/229767
PCT Pub. Date: Nov. 18, 2021

(65) Prior Publication Data
US 2023/0204261 A1 Jun. 29, 2023

(51) Int. Cl.
*F25B 21/00* (2006.01)

(52) U.S. Cl.
CPC ...... *F25B 21/00* (2013.01); *F25B 2321/0023* (2013.01)

(58) Field of Classification Search
CPC .............. F25B 21/00; F25B 2321/0023; F25B 2321/00; F25B 2321/002
See application file for complete search history.

(56) References Cited

U.S. PATENT DOCUMENTS

| 5,581,162 | A | 12/1996 | Takita |
| 11,015,842 | B2* | 5/2021 | Schroeder ........... F28D 15/0275 |
| 11,054,176 | B2* | 7/2021 | Schroeder ............... F25B 21/00 |
| 2015/0007582 | A1* | 1/2015 | Kim ........................ F25B 21/00 62/3.1 |

(Continued)

FOREIGN PATENT DOCUMENTS

| FR | 2580385 A1 | 10/1986 |
| JP | 61-195013 U | 12/1986 |

(Continued)

OTHER PUBLICATIONS

International Search Report and Written Opinion dated Jul. 21, 2020, received for PCT Application PCT/JP2020/019338, filed on May 14, 2020, 8 pages including English Translation.

(Continued)

*Primary Examiner* — Ana M Vazquez
(74) *Attorney, Agent, or Firm* — XSENSUS LLP

(57) ABSTRACT

A magnetic refrigerator including an electromagnet for magnetic refrigeration. The electromagnet for magnetic refrigeration includes: a return yoke; at least one pair of opposite magnetic poles disposed inside the return yoke and spaced from each other by a gap; a pipe disposed in the gap to pass a heat transport medium therethrough; a magneto-caloric member disposed inside the pipe to exchange heat with the heat transport medium; and a coil to surround at least one of the paired opposite magnetic poles to generate a magnetic flux passing across the gap when the coil is energized.

19 Claims, 25 Drawing Sheets

(56) References Cited

U.S. PATENT DOCUMENTS

2018/0182529 A1    6/2018    Shirouzu et al.

FOREIGN PATENT DOCUMENTS

| JP | 4-322099 A | 11/1992 |
| JP | 5-111042 A | 4/1993 |
| JP | 2004-317040 A | 11/2004 |
| JP | 2004-361061 A | 12/2004 |
| JP | 2011-58709 A | 3/2011 |
| JP | 2012-237496 A | 12/2012 |
| JP | 2018-107183 A | 7/2018 |

OTHER PUBLICATIONS

Notice of Reasons for Refusal dated Apr. 6, 2021, received for JP Application 2020-570078, 7 pages including English Translation.
Decision to Grant dated May 18, 2021, received for JP Application 2020-570078, 6 pages including English Translation.
Extended European Search Report dated May 11, 2023 in corresponding European Patent Application No. 20935467.9, 10 pages.

* cited by examiner

MAGNETIC REFRIGERATOR

CROSS-REFERENCE TO RELATED APPLICATION

The present application is based on PCT filing PCT/JP2020/019338, filed May 14, 2020, the entire contents of which are incorporated herein by reference.

TECHNICAL FIELD

The present disclosure relates to a magnetic refrigerator.

BACKGROUND ART

Magnetic refrigeration technology is known as environmentally-conscious refrigeration technology. Magnetic refrigeration technology utilizes a magnetocaloric effect, that is, when a magnetic field is applied to a substance referred to as a magnetocaloric material in an adiabatic state, the temperature of the magnetocaloric material increases, and when the magnetic field is removed therefrom, the temperature of the magnetocaloric material decreases.

Japanese Patent Application Laying-Open No. 2004-361061 discloses a magnetic refrigerator comprising a storage body in which a magnetocaloric material is stored, and an air core coil disposed so as to surround the storage body.

CITATION LIST

Patent Literature

[PTL 1] Japanese Patent Laying-Open No. 2004-361061

SUMMARY OF INVENTION

Technical Problem

For the magnetic refrigerator described in Japanese Patent Laying-Open No. 2004-361061, however, the storage body having the magnetocaloric material stored therein is disposed inside the air core coil, and it is difficult to enhance a magnetic field applied to the magnetocaloric material, and it is difficult to increase a difference in temperature of the magnetocaloric material between a state in which the magnetic field is applied thereto and a state in which the magnetic field is removed therefrom. It is thus difficult for the magnetic refrigerator to enhance the magnetocaloric material's endothermic/exothermic effect.

A main object of the present disclosure is to provide an electromagnet for magnetic refrigeration and a magnetic refrigerator capable of enhancing a magnetocaloric material's endothermic/exothermic effect.

Solution to Problem

A magnetic refrigerator according to the present disclosure comprises an electromagnet for magnetic refrigeration. The electromagnet for magnetic refrigeration includes: a return yoke; at least one pair of opposite magnetic poles disposed inside the return yoke and spaced from each other by a gap; a pipe disposed in the gap to pass a heat transport medium therethrough; a magnetocaloric member disposed inside the pipe to exchange heat with the heat transport medium; and a coil to surround at least one of the paired opposite magnetic poles to generate a magnetic flux passing across the gap when the coil is energized.

Advantageous Effects of Invention

According to the present disclosure a magnetic refrigerator capable of enhancing a magnetocaloric material's endothermic/exothermic effect can be provided.

DESCRIPTION OF EMBODIMENTS

Embodiments of the present disclosure will now be described with reference to the accompanying drawings. In the figures, identical or equivalent components are identically denoted and will not be described redundantly.

First Embodiment

Figure 1:
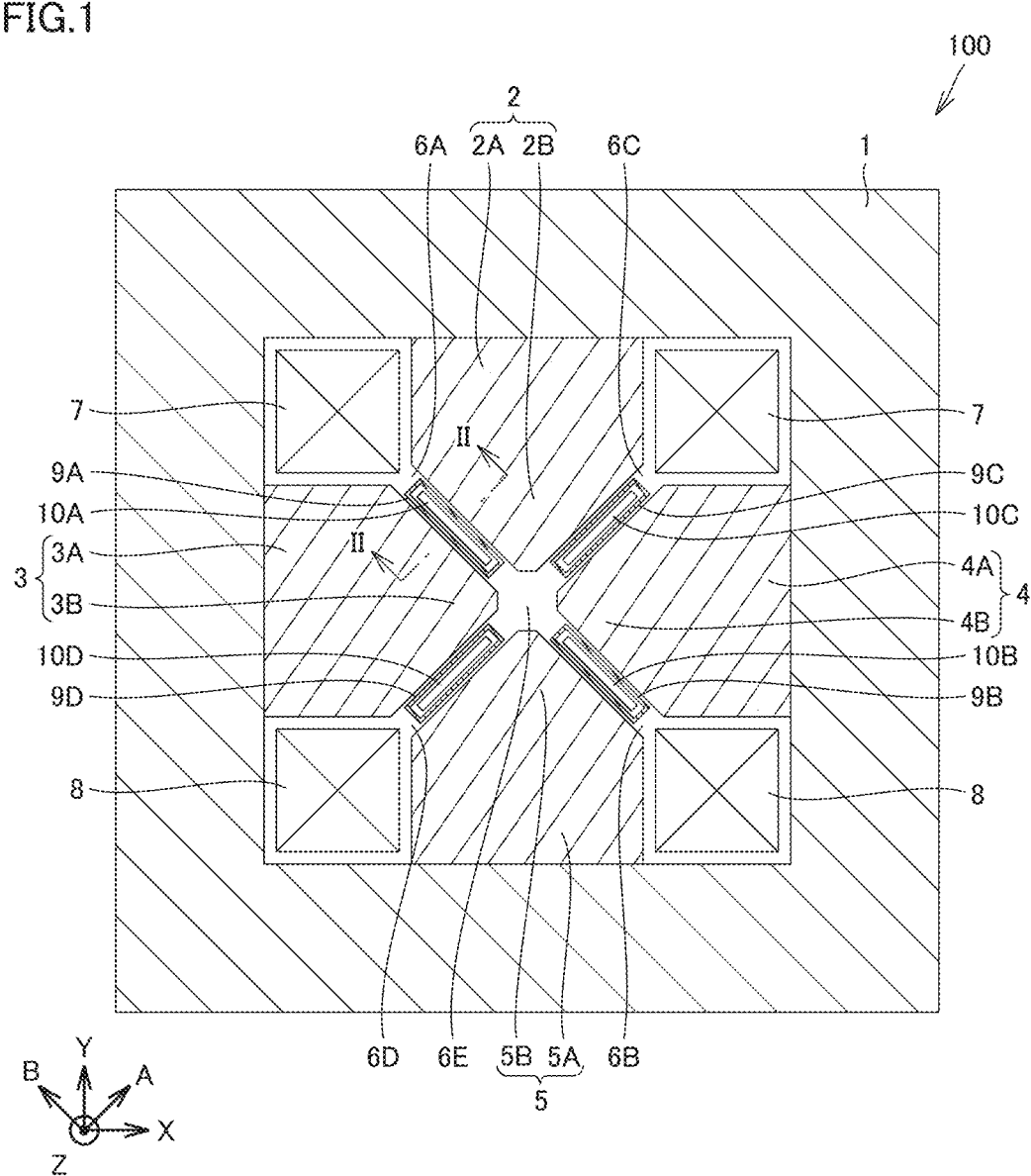
FIG. 1 is a diagram showing an electromagnet for magnetic refrigeration according to a first embodiment.

As shown in FIG. 1, an electromagnet 100 for magnetic refrigeration according to a first embodiment comprises a return yoke 1, a first magnetic pole 2, a second magnetic pole 3, a third magnetic pole 4, a fourth magnetic pole 5, a first coil 7, and a second coil 8.

As shown in FIG. 1, return yoke 1 is in the form of a quadrangular ring for example. In FIG. 1, return yoke 1 has a portion extending in an X direction and a portion extending in a Y direction orthogonal to the X direction. Each portion of return yoke 1 extends in a Z direction orthogonal to each of the X direction and the Y direction. Note that FIG. 1 indicates a first direction A and a second direction B inclined with respect to the X direction and the Y direction. First direction A intersects second direction B, and is orthogonal to second direction B for example. While first direction A may be inclined with respect to the X direction and the Y direction at any angle, the angle is preferably 45 degrees in view of suppressing magnetic saturation (hereinafter simply referred to as saturation) of each of first to fourth magnetic poles 2 to 5.

First to fourth magnetic poles 2 to 5 are disposed inside return yoke 1. First to fourth magnetic poles 2 to 5 are in contact with an inner peripheral surface of return yoke 1 or magnetically coupled to return yoke 1. While material constituting each of return yoke 1 and first to fourth magnetic poles 2 to 5 may be any magnetic material, it includes, for example, at least one selected from the group consisting of iron (Fe), cobalt (Co), and nickel (Ni).

First magnetic pole 2 is spaced from second magnetic pole 3 in first direction A by a first gap 6A. First magnetic pole 2 is spaced from fourth magnetic pole 5 in the Y direction by a center gap 6E.

First magnetic pole 2 has a first portion 2A inner than first coil 7, which will be described later, in the X direction, and a second portion 2B connected to first portion 2A and inner than first portion 2A in the Y direction. Second portion 2B has a surface extending in first direction A, a surface extending in second direction B, and a surface interconnecting the two surfaces and extending in the X direction. Second portion 2B has a width in the X direction decreasing from outside toward inside in the Y direction.

Second magnetic pole 3 is spaced from fourth magnetic pole 5 in second direction B by a fourth gap 6D. Second magnetic pole 3 is spaced from third magnetic pole 4 in the X direction by center gap 6E.

Second magnetic pole 3 has a first portion 3A located between first and second coils 7 and 8, which will be described later, in the Y direction, and a second portion 3B connected to first portion 3A and inner than first portion 3A in the X direction. Second portion 3B has a surface extending in first direction A, a surface extending in second direction B, and a surface interconnecting the two surfaces and extending in the Y direction. Second portion 3B has a width in the Y direction decreasing from outside toward inside in the X direction.

Third magnetic pole 4 is spaced from fourth magnetic pole 5 in first direction A by a second gap 6B.

Third magnetic pole 4 has a first portion 4A located between first and second coils 7 and 8 in the Y direction, and a second portion 4B connected to first portion 4A and inner than first portion 4A in the X direction. Second portion 4B has a surface extending in first direction A, a surface extending in second direction B, and a surface interconnecting the two surfaces and extending in the Y direction. Second portion 4B has a width in the Y direction decreasing from outside toward inside in the X direction.

Fourth magnetic pole 5 has a first portion 5A inner than second coil 8 in the X direction, and a second portion 5B connected to first portion 5A and inner than first portion 5A in the Y direction. Second portion 5B has a surface extending in first direction A, a surface extending in second direction B, and a surface interconnecting the two surfaces and extending in the X direction. Second portion 5B has a width in the X direction decreasing from outside toward inside in the Y direction.

First gap 6A faces a surface of first magnetic pole 2 extending at second portion 2B in second direction B and a surface of second magnetic pole 3 extending at second portion 3B in second direction B. As shown in FIG. 1, when viewed in the Z direction, first gap 6A has a longitudinal direction in second direction B and a shorter-side direction in first direction A.

Second gap 6B faces a surface of third magnetic pole 4 extending at second portion 4B in second direction B and a surface of fourth magnetic pole 5 extending at second portion 5B in second direction B. As shown in FIG. 1, when viewed in the Z direction, second gap 6B has a longitudinal direction in second direction B and a shorter-side direction in first direction A.

Third gap 6C faces a surface of first magnetic pole 2 extending at second portion 2B in first direction A and a surface of third magnetic pole 4 extending at second portion 4B in first direction A. As shown in FIG. 1, when viewed in the Z direction, third gap 6C has a longitudinal direction in first direction A and a shorter-side direction in second direction B.

Fourth gap 6D faces a surface of second magnetic pole 3 extending at second portion 3B in first direction A and a surface of fourth magnetic pole 5 extending at second portion 5B in first direction A. As shown in FIG. 1, when viewed in the Z direction, fourth gap 6D has a longitudinal direction in first direction A and a shorter-side direction in second direction B.

Center gap 6E faces a surface of first magnetic pole 2 extending at second portion 2B in the X direction, a surface of second magnetic pole 3 extending at second portion 3B in the Y direction, a surface of third magnetic pole 4 extending at second portion 4B in the Y direction, and a surface of fourth magnetic pole 5 extending at second portion 5B in the X direction. Center gap 6E is contiguous to each of first to fourth gaps 6A to 6D.

Electromagnet 100 for magnetic refrigeration has first and second magnetic poles 2 and 3 to form a pair of opposite magnetic poles opposite to each other with first gap 6A therebetween, and has third and fourth magnetic poles 4 and 5 to form a pair of opposite magnetic poles opposite to each other with second gap 6B therebetween.

First gap 6A and second gap 6B are disposed so as to sandwich center gap 6E in second direction B. Third and fourth gaps 6C and 6D are disposed so as to sandwich center gap 6E in first direction A.

A spacing (or gap length) of first gap 6A in first direction A is equal for example to a spacing (or gap length) of second gap 6B in first direction A. A spacing (or gap length) of third gap 6C in second direction B is equal for example to a spacing (or gap length) of fourth gap 6D in second direction B. The spacing of each of first to fourth gaps 6A to 6D is smaller than, for example, a spacing of center gap 6E in the X direction, a spacing of center gap 6E in the Y direction, a spacing of center gap 6E in first direction A, and a spacing of center gap 6E in second direction B.

The spacing of each of first to fourth gaps 6A to 6D is smaller than, for example, a width of first coil 7 in a direction along the central axis of first coil 7 (i.e., first direction A) and a width of second coil 8 in a direction along the central axis of second coil 8 (i.e., second direction B).

First coil 7 surrounds first magnetic pole 2 in the X direction. Second coil 8 surrounds fourth magnetic pole 5 in the X direction. First and second coils 7 and 8 have their respective central axes extending in the Y direction. When first and second coils 7 and 8 are energized, they generate a magnetic flux passing across first gap 6A and fourth gap 6D and a magnetic flux passing across second and third gaps 6B and 6C. When first to fourth magnetic poles 2 to 5 are each unsaturated, the magnetic flux passing across first gap 6A and the magnetic flux passing across second gap 6B each extend in first direction A, and the magnetic flux passing across third gap 6C and the magnetic flux passing across fourth gap 6D each extend in second direction B.

Figure 3:
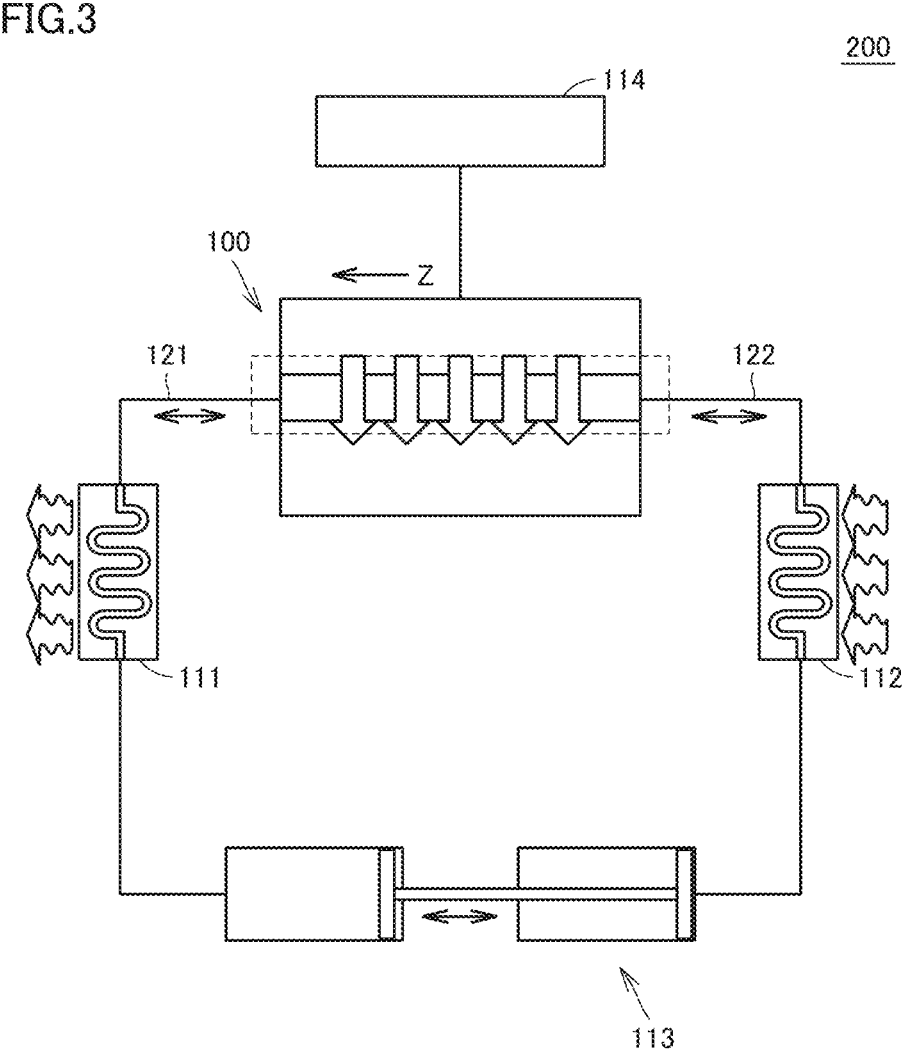
FIG. 3 is a block diagram representing a magnetic refrigerator according to the first embodiment.

First and second coils 7 and 8 are each connected to a power source (a power source 114 in FIG. 3). First and second coils 7 and 8 are concurrently energized or concurrently unenergized. In other words, the power source switches a first state in which first and second coils 7 and 8 are concurrently energized (see FIG. 4) to a second state in which first and second coils 7 and 8 are concurrently unenergized (see FIG. 5), and vice versa.

As shown in FIG. 1, electromagnet 100 for magnetic refrigeration further comprises a first pipe 9A, a second pipe 9B, a third pipe 9C, a fourth pipe 9D, a first magnetocaloric member 10A, a second magnetocaloric member 10B, a third magnetocaloric member 10C, and a fourth magnetocaloric member 10D.

Figure 2:
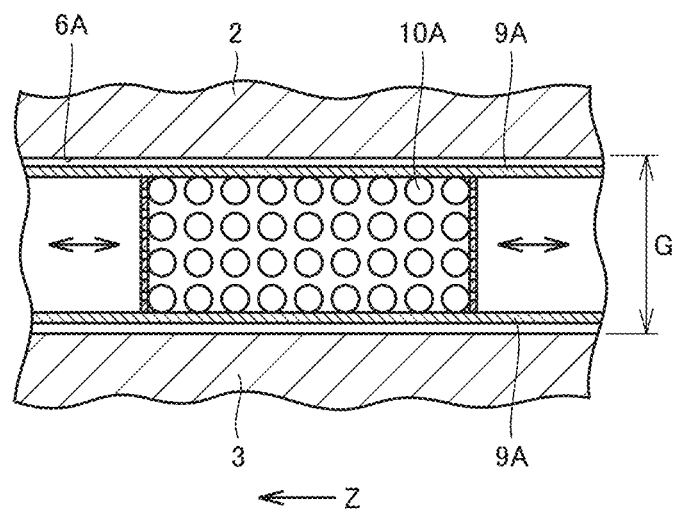
FIG. 2 is a partial cross-section taken along an arrow II-II indicated in FIG. 1.

As shown in FIGS. 1 and 2, first pipe 9A is disposed in first gap 6A. When viewed in the Z direction, first pipe 9A has a longitudinal direction in second direction B and a shorter-side direction in first direction A. First pipe 9A has an outer peripheral surface spaced for example from a surface of each of first and second magnetic poles 2 and 3. First pipe 9A may have the outer peripheral surface for example in contact with the surface of each of first and second magnetic poles 2 and 3. Inside first pipe 9A is disposed first magnetocaloric member 10A. First magnetocaloric member 10A is held inside first pipe 9A.

Second pipe 9B is disposed in second gap 6B. When viewed in the Z direction, second pipe 9B has a longitudinal direction in second direction B and a shorter-side direction in first direction A. Second pipe 9B has an outer peripheral surface spaced for example from a surface of each of third and fourth magnetic poles 4 and 5. Second pipe 9B may have the outer peripheral surface for example in contact with the surface of each of third and fourth magnetic poles 4 and 5. Inside second pipe 9B is disposed second magnetocaloric member 10B. Second magnetocaloric member 10B is held inside second pipe 9B.

Third pipe 9C is disposed in third gap 6C. When viewed in the Z direction, third pipe 9C has a longitudinal direction in first direction A and a shorter-side direction in second direction B. Third pipe 9C has an outer peripheral surface spaced for example from a surface of each of first and third magnetic poles 2 and 4. Third pipe 9C may have the outer peripheral surface for example in contact with the surface of each of first and third magnetic poles 2 and 4. Inside third pipe 9C is disposed third magnetocaloric member 10C. Third magnetocaloric member 10C is held inside third pipe 9C.

Fourth pipe 9D is disposed in fourth gap 6D. When viewed in the Z direction, fourth pipe 9D has a longitudinal direction in first direction A and a shorter-side direction in second direction B. Fourth pipe 9D has an outer peripheral surface spaced for example from a surface of each of second and fourth magnetic poles 3 and 5. Fourth pipe 9D may have the outer peripheral surface for example in contact with the surface of each of second and fourth magnetic poles 3 and 5. Inside fourth pipe 9D is disposed fourth magnetocaloric member 10D. Fourth magnetocaloric member 10D is held inside fourth pipe 9D.

First, second, third and fourth pipes 9A, 9B, 9C, and 9D each extend in the Z direction. First, second, third and fourth pipes 9A, 9B, 9C, and 9D are each for example a straight pipe. First, second, third and fourth pipes 9A, 9B, 9C, and 9D may each for example be a reciprocating pipe formed of a plurality of straight pipes connected in series by a U-shaped pipe.

When electromagnet 100 for magnetic refrigeration is incorporated in magnetic refrigerator 200, first, second, third and fourth pipes 9A, 9B, 9C, and 9D each have one and the other ends in the Z direction connected to an inflow/outflow pipe. When electromagnet 100 for magnetic refrigeration is incorporated in magnetic refrigerator 200, first, second, third and fourth pipes 9A, 9B, 9C, and 9D pass a heat transport medium therethrough. The heat transport medium passes through each of first, second, third and fourth pipes 9A, 9B, 9C, and 9D in the Z direction.

First, second, third and fourth magnetocaloric members 10A, 10B, 10C and 10D are composed of a material including a mnagnetocaloric material. The magnetocaloric material is a material having a magnetocaloric effect, and for example includes gadolinium (Gd).

First, second, third and fourth magnetocaloric members 10A, 10B, 10C and 10D each have a gap formed therein to pass the heat transport medium therethrough. First, second, third and fourth magnetocaloric members 10A, 10B, 10C and 10D are each, for example, an aggregate of particles of a magnetocaloric material and introduced into each of first, second, third and fourth pipes 9A, 9B, 9C, and 9D. In this case, the gap is formed between a plurality of particles.

The sum of the width in second direction B of each of first and second magnetocaloric members 10A and 10B and the width in first direction A of each of third and fourth magnetocaloric members 10C and 10D is longer than the inner diameter of each of first and second coils 7 and 8.

<Configuration of Magnetic Refrigerator>

As shown in FIG. 3, magnetic refrigerator 200 comprises electromagnet 100 for magnetic refrigeration shown in FIG. 1, a first heat exchanger 111, a second heat exchanger 112, and a pump 113.

First heat exchanger 111 externally releases heat of the heat transport medium generated as it is heated in electromagnet 100 for magnetic refrigeration and thus has high temperature. That is, first heat exchanger 111 exchanges heat between the heat transport medium and an external medium, and thus heats the external medium.

Second heat exchanger 112 allows the heat transport medium to absorb heat from outside second heat exchanger 112 as the heat transport medium is cooled in electromagnet 100 for magnetic refrigeration and thus has low temperature. That is, second heat exchanger 112 exchanges heat between the heat transport medium and the external medium, and thus cools the external medium.

Pump 113 is, for example, a reciprocating pump. Pump 113 alternately repeats a first operation and a second operation. In the first operation, pump 113 delivers the heat transport medium heated in electromagnet 100 for magnetic refrigeration to first heat exchanger 111, and delivers the heat transport medium having absorbed heat at second heat exchanger 112 to electromagnet 100 for magnetic refrigeration. In the second operation, pump 113 delivers the heat transport medium cooled in electromagnet 100 for magnetic refrigeration to second heat exchanger 112, and delivers the heat transport medium having dissipated heat at first heat exchanger 111 to electromagnet 100 for magnetic refrigeration.

Magnetic refrigerator 200 further includes an inflow/outflow pipe 121 and an inflow/outflow pipe 122. Inflow/outflow pipe 121 interconnects electromagnet 100 for magnetic refrigeration and first heat exchanger 111. Inflow/outflow pipe 122 interconnects electromagnet 100 for magnetic refrigeration and second heat exchanger 112. First, second, third and fourth pipes 9A, 9B, 9C, and 9D are each connected to inflow/outflow pipes 121 and 122 such that the pipes are in parallel to one another.

Figure 6:
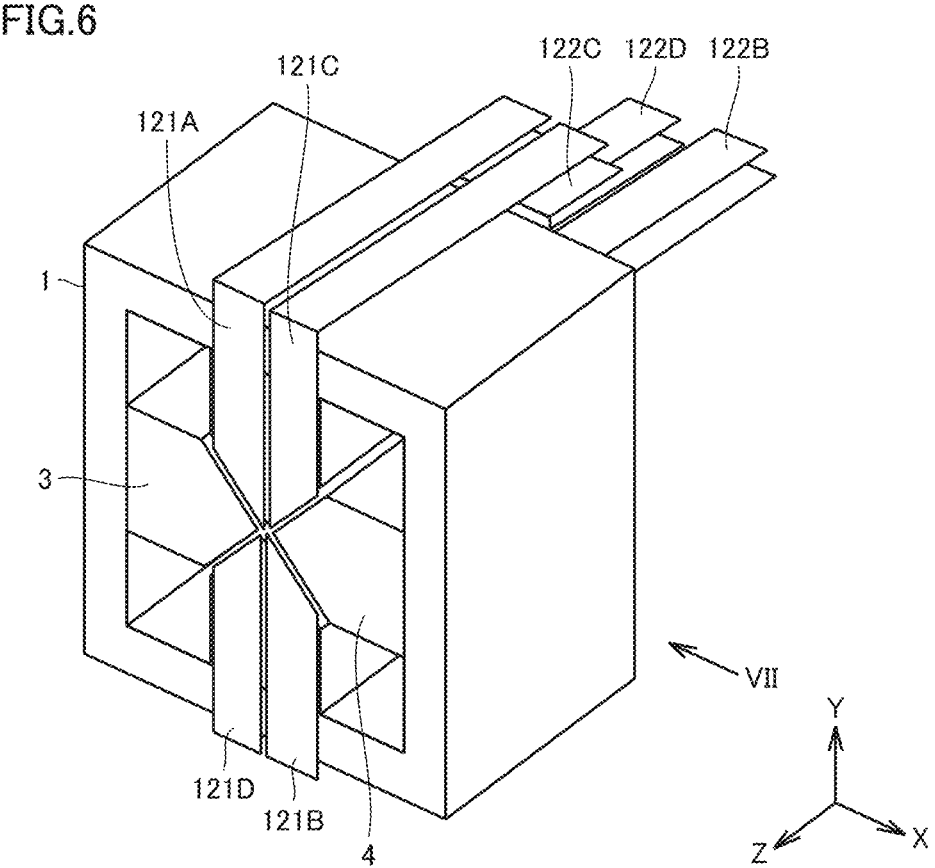
FIG. 6 is a perspective view showing an example of connection in the magnetic refrigerator shown in FIG. 3 between an inflow/outflow pipe through which a heat transport medium flows in and out of the magnet for magnetic refrigeration shown in FIG. 1 and the magnet for magnetic refrigeration shown in FIG. 1.
Figure 7:
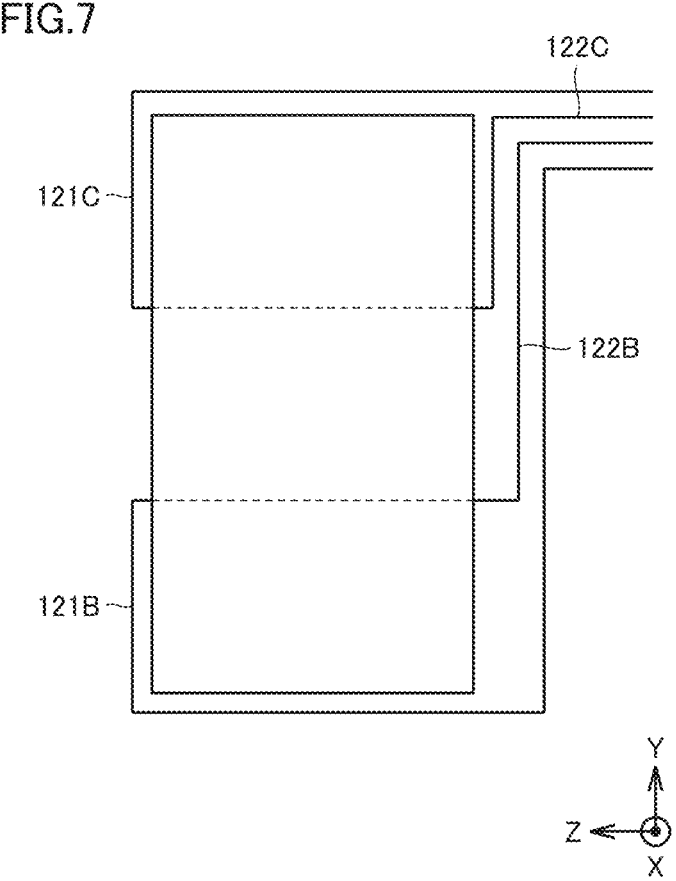
FIG. 7 is a partial side view as seen along an arrow VII indicated in FIG. 6.

As shown in FIGS. 6 and 7, inflow/outflow pipe 121 includes a pipe portion 121A, a pipe portion 121B, a pipe portion 121C, and a pipe portion 121D. Pipe portion 121A is connected to one end of first pipe 9A in the Z direction. Pipe portion 121B is connected to one end of second pipe 9B in the Z direction. Pipe portion 121C is connected to one end of third pipe 9C in the Z direction. Pipe portion 121D is connected to one end of fourth pipe 9D in the Z direction.

Inflow/outflow pipe 122 includes a pipe portion 122A, a pipe portion 122B, a pipe portion 122C, and a pipe portion 122D. Pipe portion 122A is connected to the other end of first pipe 9A in the Z direction. Pipe portion 122B is connected to the other end of second pipe 9B in the Z direction. Pipe portion 122C is connected to the other end of third pipe 9C in the Z direction. Pipe portion 122D is connected to the other end of fourth pipe 9D in the Z direction.

Pipe portion 121A and pipe portion 121C for example have a portion extending at first magnetic pole 2 in the Y direction on a surface facing one side in the Z direction, and a portion extending in the Z direction on an outer peripheral surface of return yoke 1.

Pipe portion 121B and pipe portion 121D for example have a portion extending at fourth magnetic pole 5 in the Y direction on a surface facing one side in the Z direction, and a portion extending in the Z direction on an outer peripheral surface of return yoke 1.

Pipe portion 122A and pipe portion 122C for example have a portion extending at the first magnetic pole 2 in the Y direction on a surface facing the other side in the Z direction.

Pipe portion 122B for example has a portion extending at third magnetic pole 4 in the Y direction on a surface facing the other side in the Z direction, and a portion which overlaps in the Z direction with the portion of pipe portion 122C extending in the Y direction and also extends in the Y direction.

Pipe portion 122D for example has a portion extending at second magnetic pole 3 in the Y direction on a surface facing the other side in the Z direction, and a portion which overlaps in the Z direction with the portion of pipe portion 122A extending in the Y direction and also extends in the Y direction.

Pipe portions 121B and 121D further have a portion extending at each of first and fourth magnetic poles 2 and 5 in the Y direction on a surface facing the other side in the Z direction.

First and second coils 7 and 8 are disposed, for example, outside each pipe portion.

<Operation of Electromagnet for Magnetic Refrigeration>

As described above, in FIG. 4, electromagnet 100 for magnetic refrigeration is in the first state. That is, in FIG. 4, first and second coils 7 and 8 are energized concurrently. In FIG. 5, electromagnet 100 for magnetic refrigeration is in the second state. That is, in FIG. 5, first and second coils 7 and 8 are concurrently unenergized.

Figure 4:
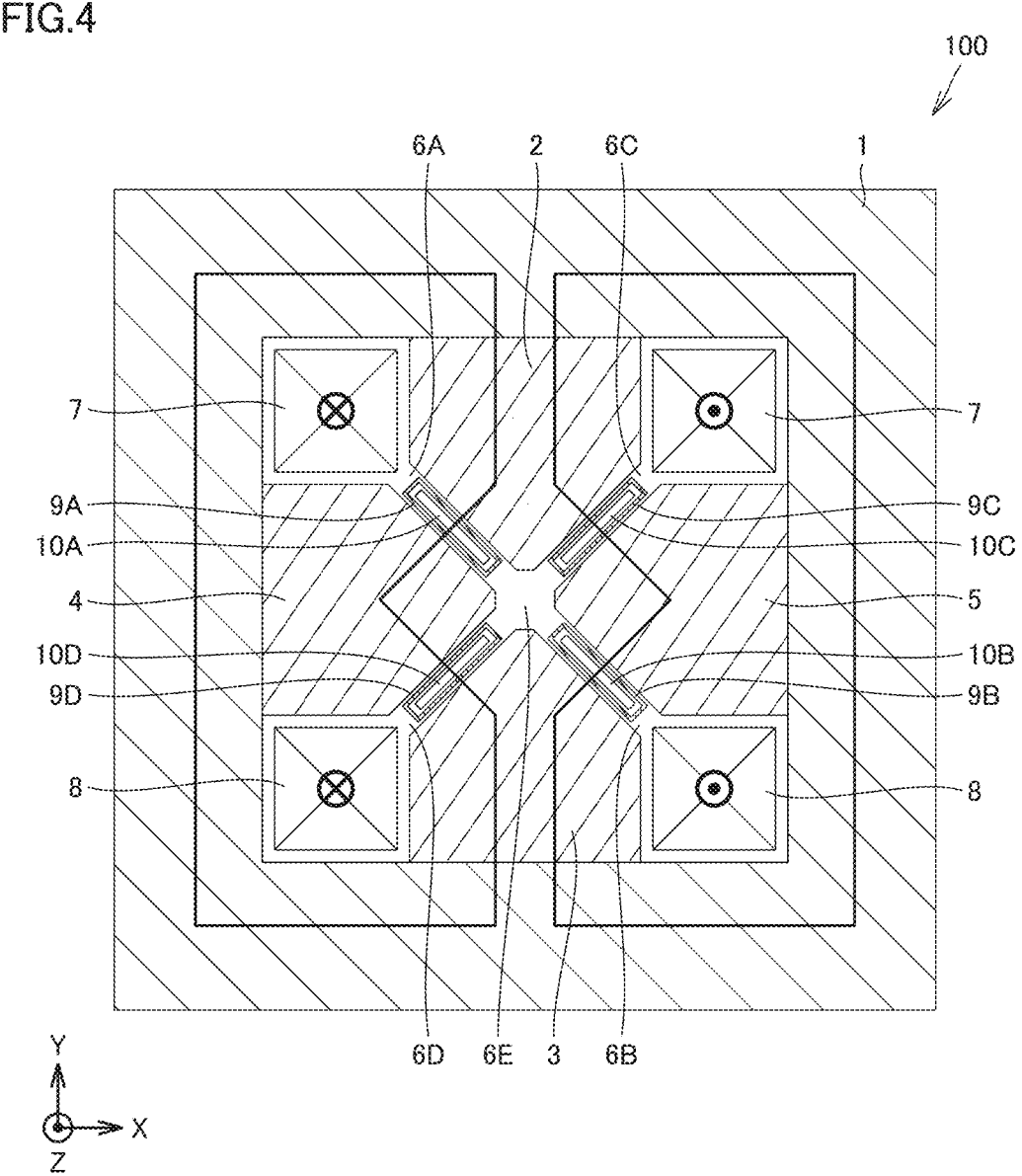
FIG. 4 is a diagram showing a first state of the electromagnet for magnetic refrigeration shown in FIG. 1.
Figure 5:
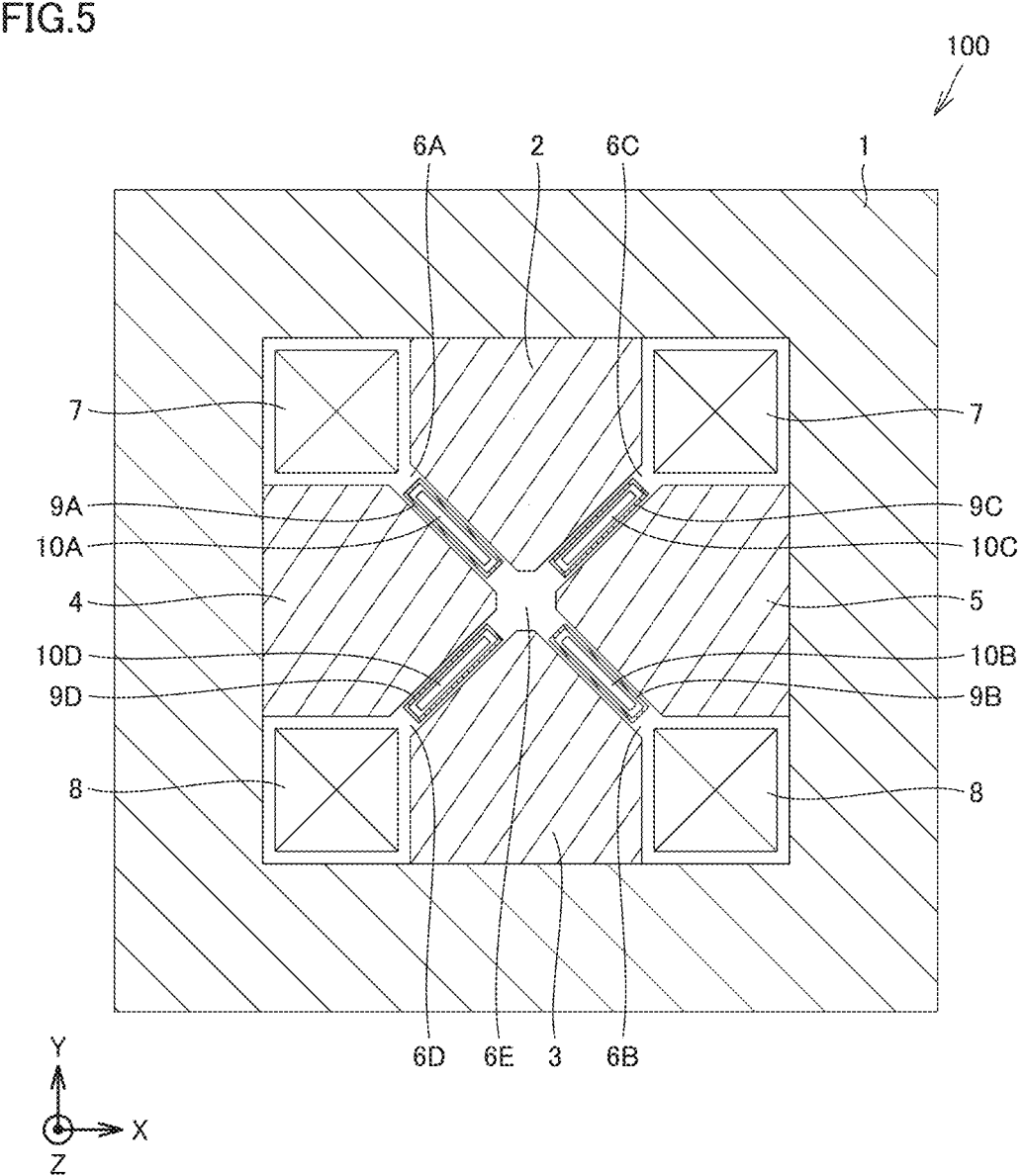
FIG. 5 is a diagram showing a second state of the electromagnet for magnetic refrigeration shown in FIG. 1.

FIG. 4 is the same as FIG. 1, although in FIG. 4, a line of magnetic induction indicating a direction in which a magnetic flux passes is indicated by a bold solid line, and also indicates a direction of a current of the coil. The line of magnetic induction is represented by a single line (the same applies hereinafter). As shown in FIG. 4, in the first state, first and second coils 7 and 8 create a magnetic flux passing across first and fourth gaps 6A and 6D and a magnetic flux passing across second and third gaps 6B and 6C. As a result, first, second, third and fourth magnetocaloric members 10A, 10B, 10C and 10D generate heat, and the heat transport medium passing through each of first, second, third and fourth pipes 9A, 9B, 9C, and 9D is heated.

As shown in FIG. 5, in the second state, there is no thick solid line as shown in FIG. 4, and no magnetic flux is formed across each of first to fourth gaps 6A to 6D. As a result, first, second, third and fourth magnetocaloric members 10A, 10B, 10C and 10D absorb heat, and the heat transport medium passing through each of first, second, third and fourth pipes 9A, 9B, 9C, and 9D is cooled.

In magnetic refrigerator 200, the first state shown in FIG. 4 and the second state shown in FIG. 5 are alternately and repeatedly switched. Pump 113 performs the first operation in the first state and performs the second operation in the second state. In the first state, the heat transport medium heated at electromagnet 100 for magnetic refrigeration is delivered from electromagnet 100 for magnetic refrigeration to first heat exchanger 111 by pump 113. Concurrently, the heat transport medium having absorbed heat of the external medium at second heat exchanger 112 is delivered to electromagnet 100 for magnetic refrigeration. Subsequently, the first state is switched to the second state. In the second state, the heat transport medium cooled at electromagnet 100 for magnetic refrigeration is delivered from electromagnet 100 for magnetic refrigeration to second heat exchanger 112 by pump 113. Concurrently, the heat transport medium having dissipated heat first heat exchanger 111 to the external medium is delivered to electromagnet 100 for magnetic refrigeration. Subsequently, the second state is switched to the first state.

The first state and the second state are switched cyclically for example at a frequency of about 0.1 Hz to 10 Hz. Thus, magnetic refrigerator 200 acts as a heat pump (a cold heat system).

<Function and Effect>

In electromagnet 100 for magnetic refrigeration, a magnetic field generated in first gap 6A between first and second magnetic poles 2 and 3 in the first state is stronger than a magnetic field generated inside an energized air core coil due to the presence of the magnetic pole and return yoke formed of a magnetic body. Therefore, an amount of heat generated in the first state by first magnetocaloric member 10A disposed in first gap 6A is larger than an amount of heat generated by a magnetocaloric member disposed inside the energized air core coil. A difference in temperature of the first magnetocaloric member 10A between the first state and the second state is larger than a difference in temperature of the magnetocaloric member disposed inside the energized air core coil therebetween. Second, third and fourth magnetocaloric members 10B, 10C and 10D are also similar to first magnetocaloric member 10A. As a result, an endothermic/exothermic effect of each of first, second, third and fourth magnetocaloric members 10A, 10B, 10C and 10D in electromagnet 100 for magnetic refrigeration is larger than that when a magnetocaloric member is disposed inside an air core coil.

As an electromagnet for magnetic refrigeration according to a comparative example, let us consider a configuration comprising first and second coils 7 and 8 and two magnetic poles (opposite magnetic poles) disposed inside each of first and second coils 7 and 8 with a single gap posed therebetween and having a longitudinal direction in the X direction. A length of first gap 6A in the longitudinal direction for electromagnet 100 for magnetic refrigeration is longer than a length of the gap in the longitudinal direction for the comparative example, and the former is for example $\sqrt{2}$ times the latter. In other words, an area of first and second magnetic poles 2 and 3 in electromagnet 100 for magnetic refrigeration that faces first gap 6A is larger than an area of the opposite magnetic poles of the comparative example that faces the gap, and the former is for example $\sqrt{2}$ times the latter. When magnetomotive force (i.e., the number of turns of a coil x the value of a current per turn) is under a fixed condition, a magnetic flux density B is fixed according to Ampere's law.

Specifically, according to Ampere's law, as equation (1), $\oint Hd1=NI$ is established, where H denotes a magnetic field, L denotes a flux path, and NI denotes magnetomotive force. When a magnetic field in the gap is Hg, a flux path in the gap has a length Lg, a magnetic field in the yoke (the return yoke and the opposite magnetic poles) is Hy, and a flux path in the yoke has a length Ly, $Hg \cdot Lg + Hy \cdot Ly = NI$ is established. When this equation is converted into magnetic flux density B with a vacuum having a magnetic permeability $\mu_0$ and the yoke having a relative magnetic permeability $\mu r$, $Bg/\mu_0 \cdot Lg + By/(\mu r \cdot \mu_0) \cdot Ly = NI$ is established as equation (2). Further, when the yoke is unsaturated, a magnetic flux density Bg in the gap is substantially equal to a magnetic flux density By in the yoke, and μr becomes as extremely large as about 10,000. Therefore, the second term on the left side of equation (2) can be ignored, and $Bg=NI \cdot \mu_0/Lg$ is established as equation (3).

According to equation (3), when the flux path in the gap has length Lg having a fixed value and magnetomotive force NI is fixed, magnetic flux density Bg in the gap will be fixed regardless of the area of the magnetic pole facing the gap. Therefore, a magnetic flux passing across first gap 6A in electromagnet 100 for magnetic refrigeration is proportional to an area of first and second magnetic poles 2 and 3 facing first gap 6A. As a result, electromagnet 100 for magnetic refrigeration in which the area of first and second magnetic poles 2 and 3 facing first gap 6A is $\sqrt{2}$ times that in the comparative example provides a magnetic flux passing across first gap 6A which is $\sqrt{2}$ times that passing across the gap of the comparative example.

Thus, an endothermic/exothermic effect of each of first, second, third and fourth magnetocaloric members 10A, 10B, 10C and 10D in electromagnet 100 for magnetic refrigeration is larger than that in the electromagnet for magnetic refrigeration according to the comparative example.

Further, electromagnet 100 for magnetic refrigeration allows first, second, third and fourth magnetocaloric members 10A, 10B, 10C and 10D to all generate heat in the first state concurrently and all absorb heat in the second state concurrently. Therefore, a difference in temperature of the heat transport medium implemented in electromagnet 100 for magnetic refrigeration is larger than a difference in temperature of each of a first heat transport medium and a second heat transport medium implemented in an electromagnet 101 described hereinafter for magnetic refrigeration as a modified example of electromagnet 100 for magnetic refrigeration.

Modified Example

Figure 8:
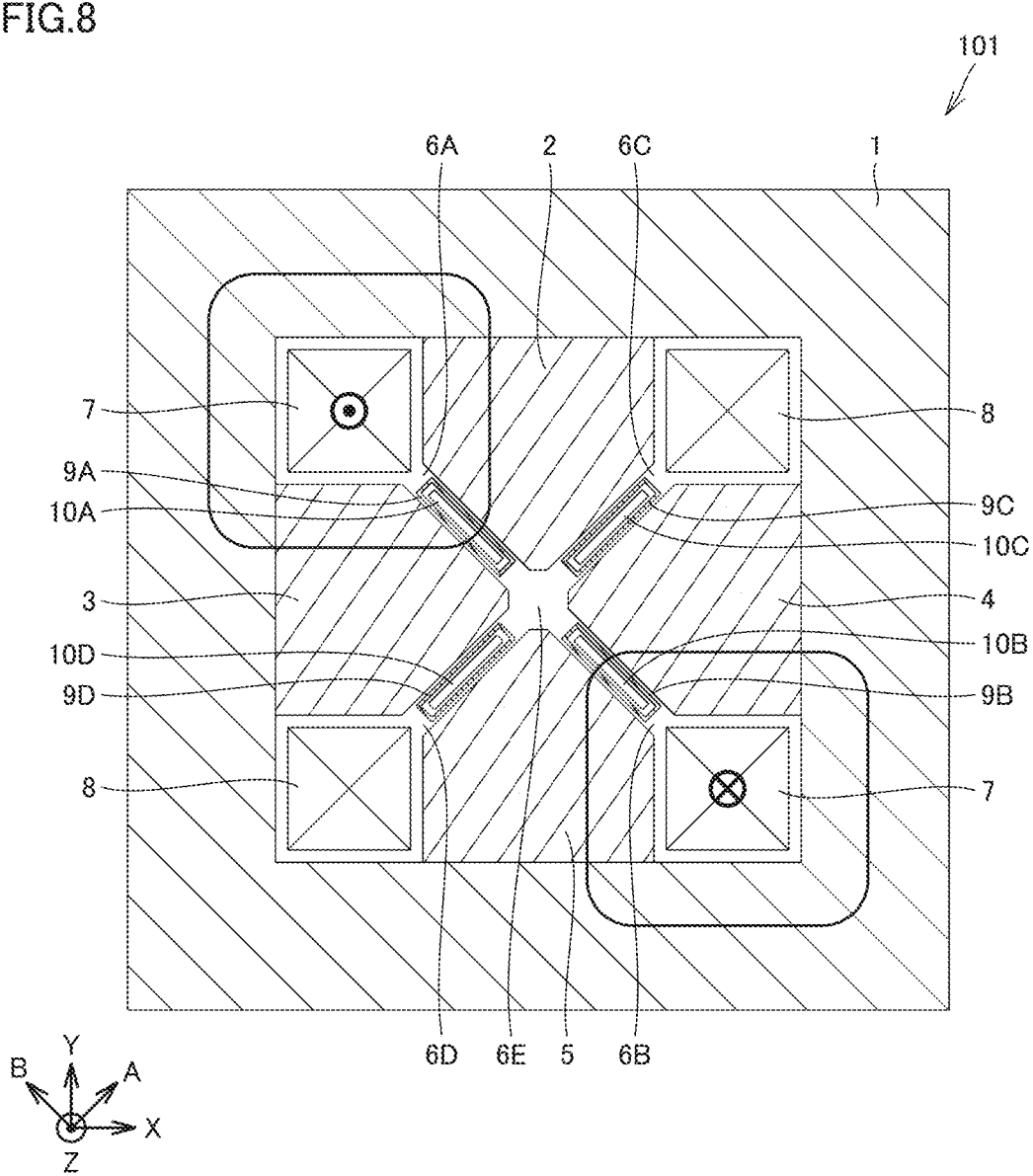
FIG. 8 is a diagram showing a third state of a modified example of the electromagnet for magnetic refrigeration shown in FIG. 1.
Figure 9:
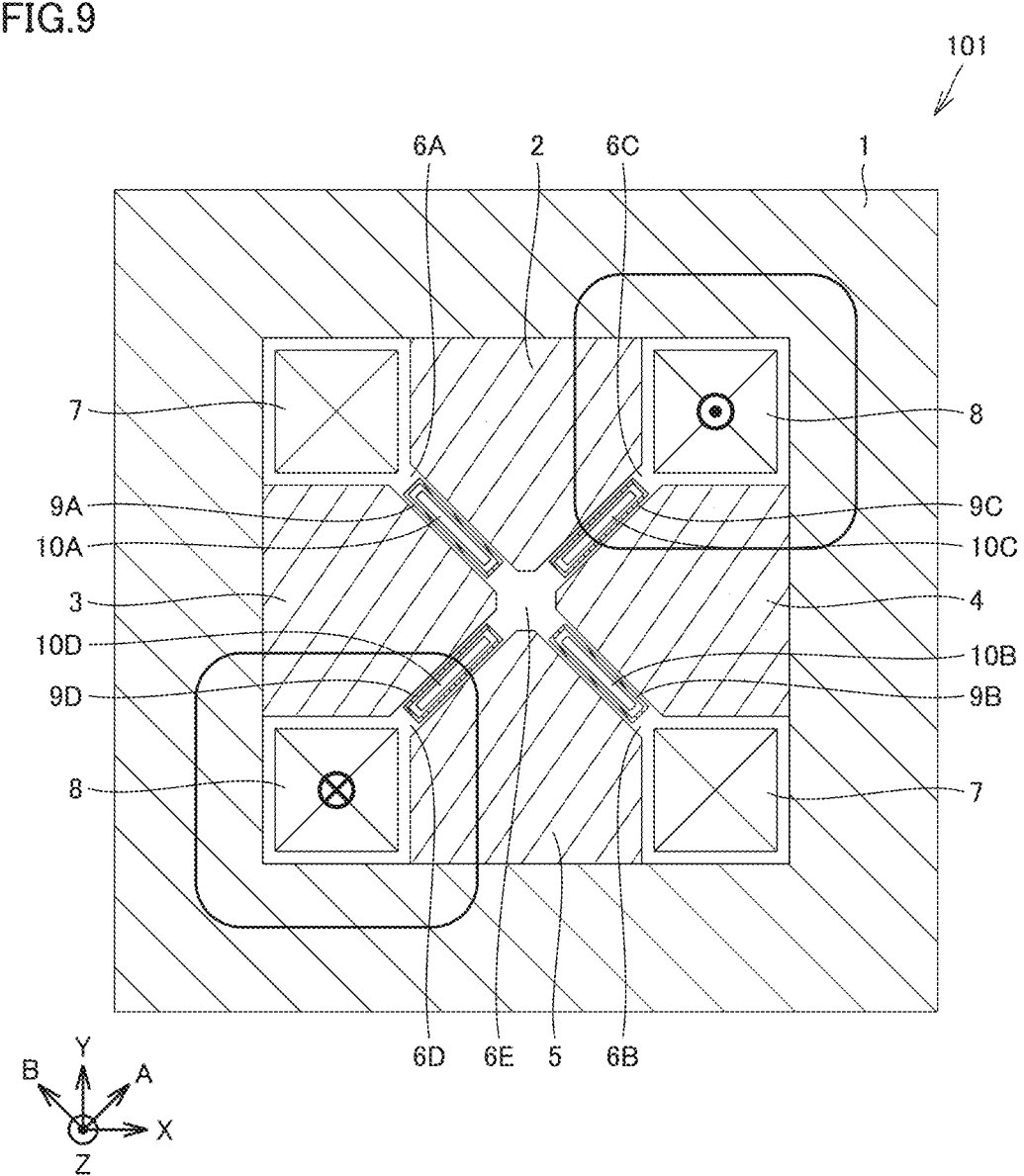
FIG. 9 is a diagram showing a fourth state of the modified example of the electromagnet for magnetic refrigeration shown in FIG. 1.
Figure 10:
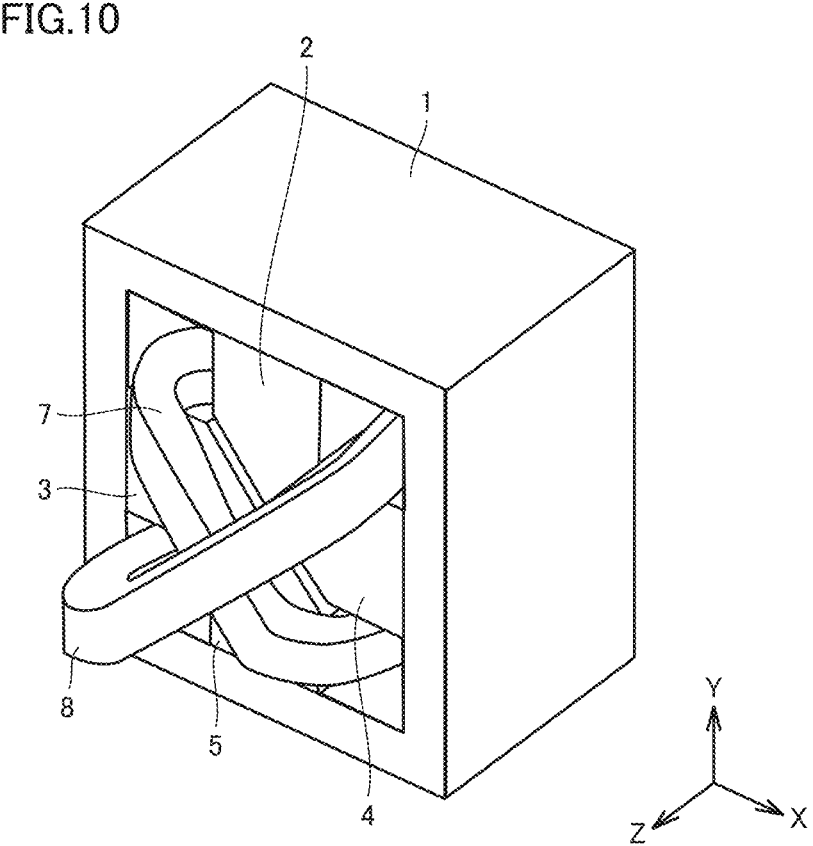
FIG. 10 is a perspective view showing a first coil and a second coil of the electromagnet for magnetic refrigeration shown in FIG. 1.

FIGS. 8 to 10 are diagrams showing electromagnet 101 for magnetic refrigeration that is a modified example of electromagnet 100 for magnetic refrigeration. Electromagnet 101 for magnetic refrigeration has a basic configuration similar to that of electromagnet 100 for magnetic refrigeration except that first and second coils 7 and 8 are configured to be different from those of electromagnet 100 for magnetic refrigeration.

As shown in FIGS. 8 to 10, first coil 7 surrounds first gap 6A, center gap 6E, and second gap 6B in second direction B. First coil 7 surrounds a portion of first to fourth magnetic poles 2 to 5 facing each of first gap 6A, center gap 6E, and second gap 6B. First coil 7 has a central axis extending in first direction A. When first coil 7 is energized it generates a magnetic flux passing across first gap 6A and a magnetic flux passing across second gap 6B. In FIGS. 8 and 9, a line of magnetic induction is indicated by a thick solid line. When first to fourth magnetic poles 2 to 5 are each unsaturated, the magnetic flux passing across first gap 6A and the magnetic flux passing across second gap 6B each extend in first direction A.

As shown in FIGS. 8 to 10, second coil 8 surrounds third gap 6C, center gap 6E, and fourth gap 6D in second direction B. Second coil 8 surrounds a portion of first to fourth magnetic poles 2 to 5 facing each of third gap 6C, center gap 6E, and fourth gap 6D. Second coil 8 has a central axis extending in second direction B. When second coil 8 is energized, it generates a magnetic flux passing across third gap 6C and a magnetic flux passing across fourth gap 6D. When first to fourth magnetic poles 2 to 5 are each unsaturated, the magnetic flux passing across third gap 6C and the magnetic flux passing across fourth gap 6D each extend in second direction B.

First and second coils 7 and 8 are each connected to a power source (power source 114 in FIG. 3). First and second coils 7 and 8 are alternately energized. In other words, the power source switches a third state in which first coil 7 is energized and second coil 8 is unenergized (see FIG. 8) to a fourth state in which first coil 7 is unenergized and second coil 8 is energized (see FIG. 9), and vice versa.

In FIG. 8, electromagnet 101 for magnetic refrigeration is in the third state. That is, in FIG. 8, first coil 7 is energized and second coil 8 is unenergized. In FIG. 9, electromagnet 100 for magnetic refrigeration is in the fourth state. That is, in FIG. 9, first coil 7 is unenergized and second coil 8 is energized.

As shown in FIG. 8, in the third state, a magnetic flux passing across first gap 6A and a magnetic flux passing across second gap 6B are formed by first coil 7. This allows first and second magnetocaloric members 10A and 10B to generate heat, and thus heats the heat transport medium passing through first and second pipes 9A and 9B. In the third state, the magnetic flux passing across third gap 6C and the magnetic flux passing across fourth gap 6D are not formed. This allows third and fourth magnetocaloric members 10C and 10D to absorb heat, and thus cools the heat transport medium passing through third and fourth pipes 9C and 9D.

As shown in FIG. 9, in the fourth state, the magnetic flux passing across third gap 6C and the magnetic flux passing across fourth gap 6D are formed by second coil 8. As a result, third and fourth magnetocaloric members 10C and 10D generate heat, and thus heats the heat transport medium passing through third and fourth pipes 9C and 9D. In the fourth state, the magnetic flux passing across first gap 6A and the magnetic flux passing across second gap 6B are not formed. This allows first and second magnetocaloric members 10A and 10B to absorb heat, and thus cools the heat transport medium passing through first and second pipes 9A and 9B.

Figure 11:
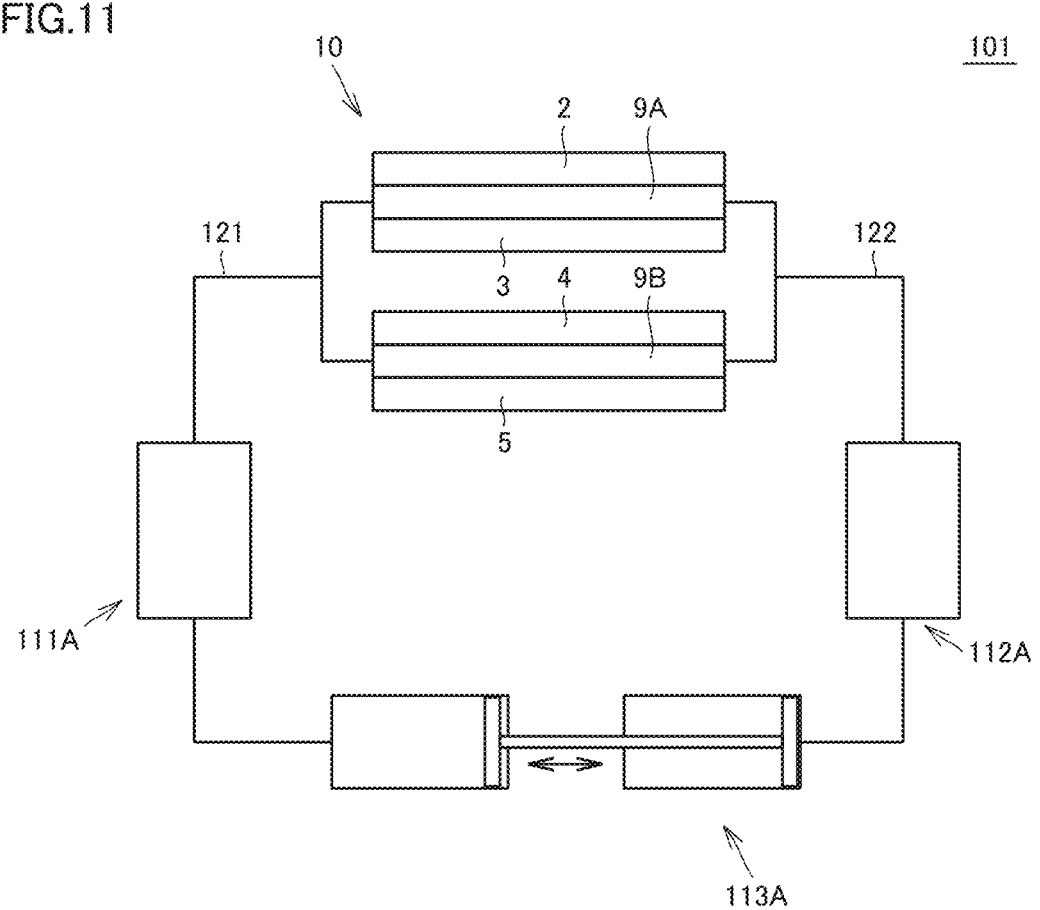
FIG. 11 is a block diagram showing a heat pump of a first system of a magnetic refrigerator comprising the electromagnet for magnetic refrigeration shown in FIGS. 8 and 9.
Figure 12:
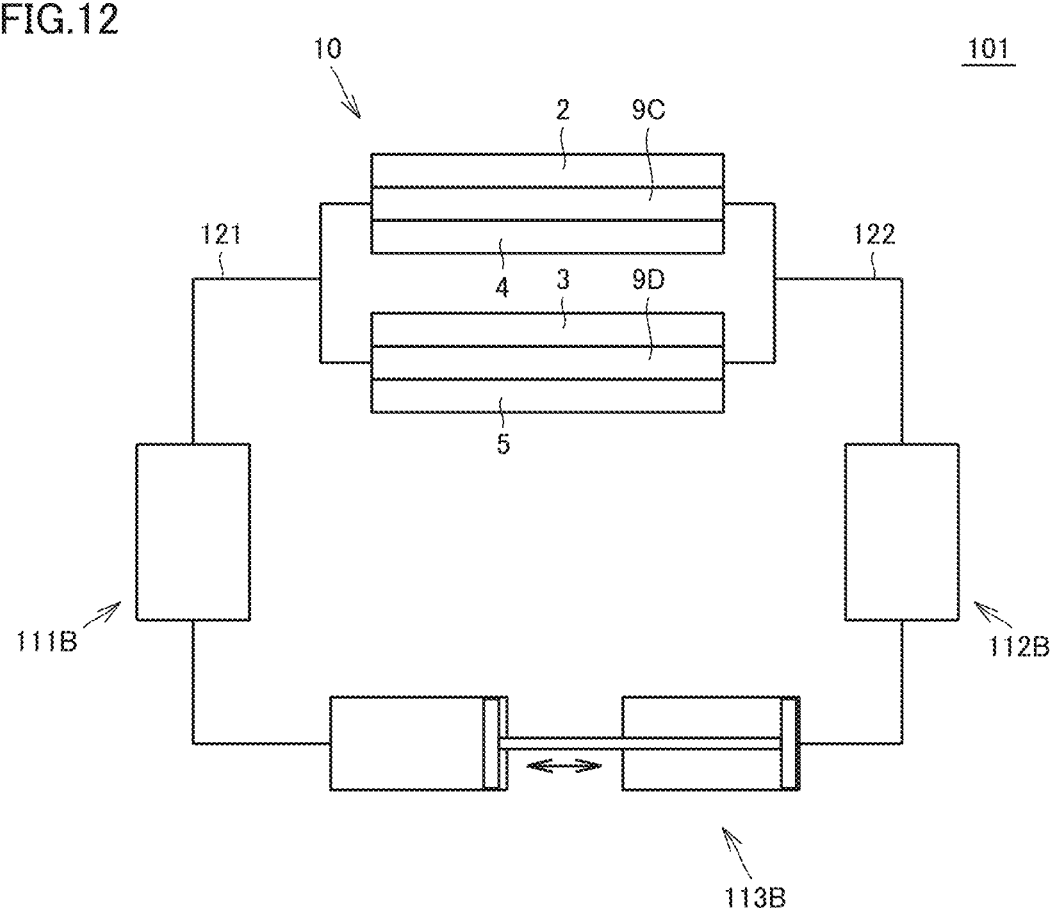
FIG. 12 is a block diagram showing a heat pump of a second system of the magnetic refrigerator comprising the electromagnet for magnetic refrigeration shown in FIGS. 8 and 9.

FIGS. 11 and 12 are block diagrams showing a magnetic refrigerator 201 comprising electromagnet 101 for magnetic refrigeration. Magnetic refrigerator 201 comprises a heat pump of a first system shown in FIG. 11 and a heat pump of a second system shown in FIG. 12. The heat pump of the first system is independent of the heat pump of the second system. The heat pump of the first system shown in FIG. 11 and the heat pump of the second system shown in FIG. 12 each basically have a configuration similar to that for magnetic refrigerator 200 shown in FIG. 3. Hereinafter, a heat transport medium for the heat pump of the first system will be referred to as a first heat transport medium, and a heat transport medium for the heat pump of the second system will be referred to as a second heat transport medium.

The heat pump of the first system shown in FIG. 11 includes first and second pipes 9A and 9B of electromagnet 101 for magnetic refrigeration, a first heat exchanger 111A, a second heat exchanger 112A, and a first pump 113A. The heat pump of the first system shown in FIG. 11 does not include third and fourth pipes 9C and 9D of electromagnet 101 for magnetic refrigeration.

As shown in FIG. 11, the heat pump of the first system has first and second pipes 9A and 9B connected to each other in parallel. The first heat transport medium is split into first and second pipes 9A and 9B in electromagnet 101 for magnetic refrigeration. In the heat pump of the first system, first pump 113A performs the first operation when electromagnet 101 for magnetic refrigeration is in the third state, and first pump 113A performs the second operation when electromagnet 101 for magnetic refrigeration is in the fourth state. Electromagnet 101 for magnetic refrigeration alternately repeats the third state and the fourth state. First pump 113A alternately repeats the first operation and the second operation.

The first heat transport medium heated at electromagnet 101 for magnetic refrigeration in the third state is delivered from electromagnet 101 for magnetic refrigeration to first heat exchanger 111A by first pump 113A. Concurrently, the first heat transport medium having absorbed heat of an external medium at second heat exchanger 112A is delivered to electromagnet 101 for magnetic refrigeration. Subsequently, the third state is switched to the fourth state. The first heat transport medium cooled at electromagnet 101 for magnetic refrigeration in the fourth state is delivered from electromagnet 101 for magnetic refrigeration to second heat exchanger 112A by first pump 113A. Concurrently, the first heat transport medium having dissipated heat to the external medium at first heat exchanger 111A is delivered to electromagnet 101 for magnetic refrigeration. Subsequently, the fourth state is switched to the third state.

The heat pump of the second system shown in FIG. 12 includes third and fourth pipes 9C and 9D of electromagnet 101 for magnetic refrigeration, a third heat exchanger 111B, a fourth heat exchanger 112B, and a second pump 113B. The heat pump of the second system shown in FIG. 12 does not include first and second pipes 9A and 9B. As shown in FIG. 12, the heat pump of the second system has third and fourth pipes 9C and 9D connected to each other in parallel. The second heat transport medium is split into third and fourth pipes 9C and 9D in electromagnet 101 for magnetic refrigeration. In the heat pump of the second system, second pump 113B performs the first operation when electromagnet 101 for magnetic refrigeration is in the fourth state, and second pump 113B performs the second operation when electromagnet 101 for magnetic refrigeration is in the third state.

The second heat transport medium cooled at electromagnet 101 for magnetic refrigeration in the third state is delivered from electromagnet 101 for magnetic refrigeration to fourth heat exchanger 112B by second pump 113B. Concurrently, the second heat transport medium having dissipated heat to the external medium at third heat exchanger 111B is delivered to electromagnet 101 for magnetic refrigeration. Subsequently, the third state is switched to the fourth state. The second heat transport medium heated at electromagnet 101 for magnetic refrigeration in the fourth state is delivered from electromagnet 101 for magnetic refrigeration to third heat exchanger 111B by second pump 113B. Concurrently, the second heat transport medium having absorbed heat of the external medium at fourth heat exchanger 112B is delivered to electromagnet 101 for magnetic refrigeration. Subsequently, the fourth state is switched to the third state.

Electromagnet 101 for magnetic refrigeration basically having a configuration similar to that of electromagnet 100 for magnetic refrigeration can be as effective as electromagnet 100 for magnetic refrigeration.

Electromagnet 100 for magnetic refrigeration and the electromagnet for magnetic refrigeration according to the comparative example heat or cool a single heat transport medium, and applying electromagnet 100 for magnetic refrigeration and the electromagnet for magnetic refrigeration according to the comparative example each to a magnetic refrigerator comprising heat pumps of two systems requires two electromagnets 100 for magnetic refrigeration and two electromagnets for magnetic refrigeration according to the comparative example. In contrast, electromagnet 101 for magnetic refrigeration can heat or cool two heat transport media, and comprising a single electromagnet 101 for magnetic refrigeration suffices for magnetic refrigerator 201 comprising heat pumps of two systems. Thus, magnetic refrigerator 201 comprising a single electromagnet 101 for magnetic refrigeration can be smaller in size than a magnetic refrigerator comprising two electromagnets 100 for magnetic refrigeration or two electromagnets for magnetic refrigeration according to the comparative example.

Further, electromagnet 101 for magnetic refrigeration in magnetic refrigerator 201 comprising heat pumps of two systems can heat the first heat transport medium for one heat pump and concurrently cool the second heat transport medium for the other heat pump. Electromagnet 101 for magnetic refrigeration is thus higher in efficiency than electromagnet 100 for magnetic refrigeration.

Second Embodiment

Figure 13:
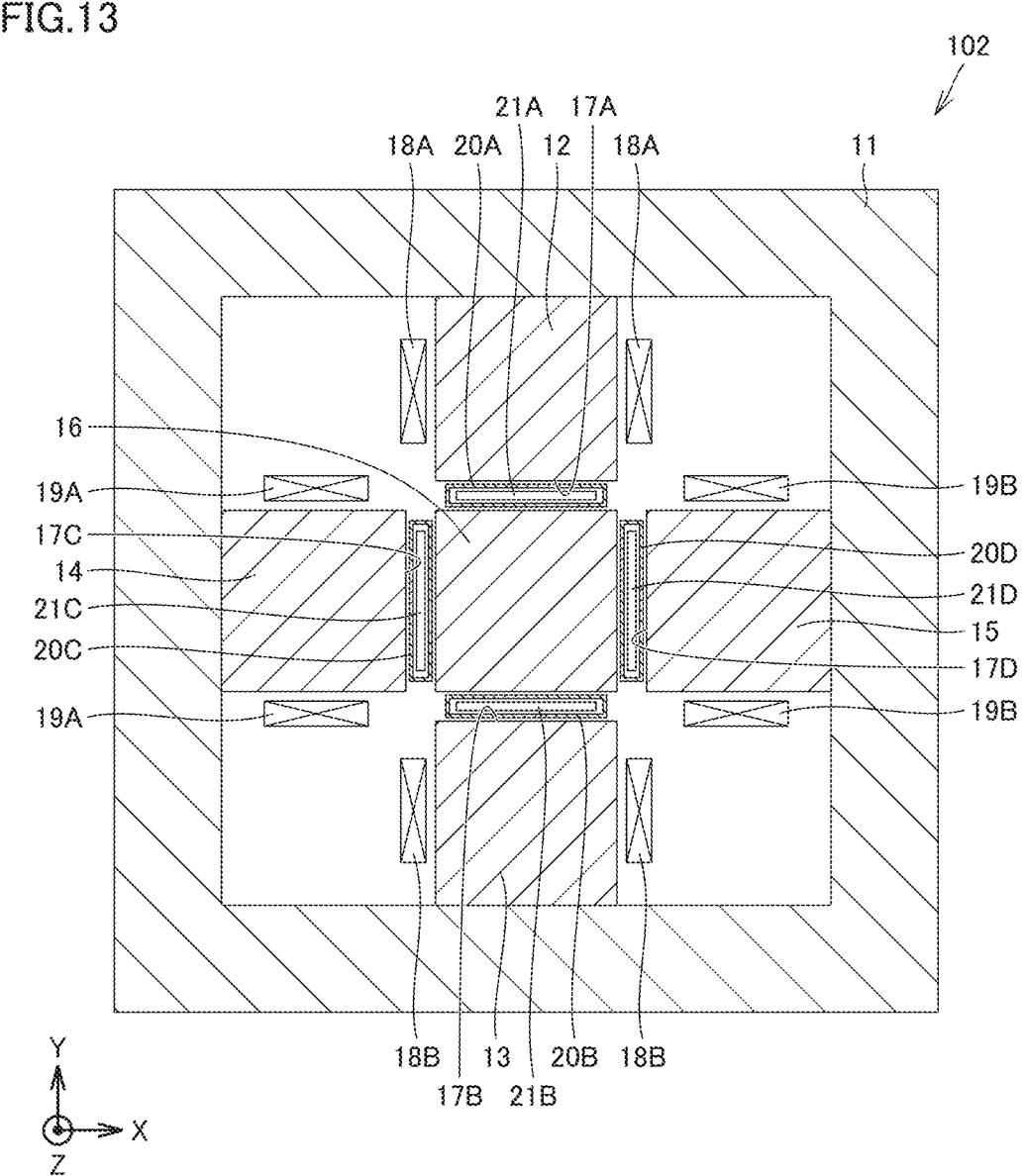
FIG. 13 is a diagram showing an electromagnet for magnetic refrigeration according to a second embodiment.

As shown in FIG. 13, an electromagnet 102 for magnetic refrigeration according to a second embodiment comprises a return yoke 11, a fifth magnetic pole 12, a sixth magnetic pole 13, a seventh magnetic pole 14, an eighth magnetic pole 15, a centered magnetic pole 16, a third coil 18A, a fourth coil 18B, a fifth coil 19A, and a sixth coil 19B.

As shown in FIG. 13, return yoke 11 has a configuration similar to that of return yoke 1 shown in FIG. 1. Return yoke 11 is in the form of a quadrangular ring for example. Return yoke 11 has a portion extending in the X direction and a portion extending in the Y direction orthogonal to the X direction. Each portion of return yoke 11 extends in the Z direction orthogonal to each of the X direction and the Y direction.

Fifth, sixth, seventh and eighth magnetic poles 12, 13, 14 and 15, and centered magnetic pole 16 are disposed inside return yoke 11. Fifth, sixth, seventh, and eighth magnetic poles 12, 13, 14, and 15 are magnetically coupled to return yoke 11.

Fifth magnetic pole 12, centered magnetic pole 16, and sixth magnetic pole 13 are aligned in the Y direction. Fifth magnetic pole 12 is spaced from centered magnetic pole 16 in the Y direction by a fifth gap 17A. Sixth magnetic pole 13 is spaced from centered magnetic pole 16 in the Y direction by a sixth gap 17B.

Seventh magnetic pole 14, centered magnetic pole 16, and eighth magnetic pole 15 are aligned in the X direction. Seventh magnetic pole 14 is spaced from centered magnetic pole 16 in the X direction by a seventh gap 17C. Eighth magnetic pole 15 is spaced from centered magnetic pole 16 in the X direction by an eighth gap 17D.

Centered magnetic pole 16 has a first surface 16A extending in the X direction and facing fifth gap 17A, a second surface 16B extending in the X direction and facing sixth gap 17B, a third surface 16C extending in the Y direction and facing seventh gap 17C, and a fourth surface 16D extending in the Y direction and facing eighth gap 17D. First, second, third, and fourth surfaces 16A, 16B, 16C, and 16D are, for example, a flat surface.

Fifth magnetic pole 12 has a flat surface extending in the X direction and facing fifth gap 17A. Sixth magnetic pole 13 has a flat surface extending in the X direction and facing sixth gap 17B. Seventh magnetic pole 14 has a flat surface extending in the Y direction and facing seventh gap 17C. Eighth magnetic pole 15 has a flat surface extending in the Y direction and facing eighth gap 17D.

Fifth, sixth, seventh and eighth magnetic poles 12, 13, 14 and 15, and centered magnetic pole 16 are for example each equivalent in configuration. When viewed in the Z direction, fifth, sixth, seventh and eighth magnetic poles 12, 13, 14 and 15, and centered magnetic pole 16 each have a planar shape for example in the form of a square.

As shown in FIG. 13, when viewed in the Z direction, fifth and sixth gaps 17A and 17B each have a longitudinal direction in the X direction and a shorter-side direction in the Y direction. When viewed in the Z direction, seventh and eighth gaps 17C and 17D each have a longitudinal direction in the Y direction and a shorter-side direction in the X direction.

In electromagnet 102 for magnetic refrigeration, fifth magnetic pole 12 and centered magnetic pole 16 form a pair of opposite magnetic poles spaced by fifth gap 17A, and sixth magnetic pole 13 and centered magnetic pole 16 form a pair of opposite magnetic poles spaced by sixth gap 17B. Further, in electromagnet 102 for magnetic refrigeration, seventh magnetic pole 14 and centered magnetic pole 16 form a pair of opposite magnetic poles spaced by seventh gap 17C, and eighth magnetic pole 15 and centered magnetic pole 16 form a pair of opposite magnetic poles spaced by eighth gap 17D.

A spacing (or length) of fifth gap 17A in first direction A is equal for example to a spacing (or length) of sixth gap 17B in first direction A. A spacing (or length) of seventh gap 17C in second direction B is equal for example to a spacing (or length) of eighth gap 17D in second direction B.

The spacing of each of fifth, sixth, seventh, and eighth gaps 17A, 17B, 17C, and 17D is smaller, for example, than a width of each of third and fourth coils 18A and 18B in a direction along the central axis of each of third and fourth coils 18A and 18B (i.e., the Y direction), and a width of each of fifth and sixth coils 19A and 19B in a direction along the central axis of each of fifth and sixth coils 19A and 19B (i.e., the X direction).

Third coil 18A surrounds fifth magnetic pole 12 in the X direction. Fourth coil 18B surrounds sixth magnetic pole 13 in the X direction. Third and fourth coils 18A and 18B have their respective central axes extending in the Y direction.

Fifth coil 19A surrounds seventh magnetic pole 14 in the Y direction. Sixth coil 19B surrounds eighth magnetic pole 15 in the Y direction. Fifth and sixth coils 19A and 19B have their respective central axes extending in the X direction.

Third, fourth, fifth and sixth coils 18A, 18B, 19A, and 19B are each connected to a power source. Third, fourth, fifth and sixth coils 18A, 18B, 19A and 19B are concurrently energized or concurrently unenergized. In other words, the power source switches a fifth state in which third, fourth, and sixth coils 18A, 18B, 19A, and 19B are concurrently energized (see FIG. 14) to a sixth state in which third, fourth, fifth and sixth coils 18A and 18B, 19A, and 19B are concurrently unenergized (see FIG. 15), and vice versa.

When third and fourth coils 18A and 18B are energized, they generate a magnetic flux passing across fifth and sixth gaps 17A and 17B. When fifth and sixth coils 19A and 19B are energized, they generate a magnetic flux passing across seventh and eighth gaps 17C and 17D. When fifth, sixth, seventh and eighth magnetic poles 12, 13, 14, 15, and centered magnetic pole 16 are each unsaturated, the magnetic flux passing across fifth and sixth gaps 17A and 17B extends in the Y direction, and the magnetic flux passing across seventh and eighth gaps 17C and 17D extends in the X direction.

As shown in FIG. 13, electromagnet 102 for magnetic refrigeration further comprises a fifth pipe 20A, a sixth pipe 20B, a seventh pipe 20C, an eighth pipe 20D, a fifth magnetocaloric member 21, a sixth magnetocaloric member 21B, a seventh magnetocaloric member 21C, and an eight magnetocaloric member 21D.

Fifth pipe 20A is disposed in fifth gap 17A. When viewed in the Z direction, fifth pipe 20A has a longitudinal direction in the X direction and a shorter-side direction in the Y direction. Fifth pipe 20A has an outer peripheral surface spaced for example from a surface of each of centered magnetic pole 16 and fifth magnetic pole 12. Fifth pipe 20A may have the outer peripheral surface for example in contact with the surface of each of centered magnetic pole 16 and fifth magnetic pole 12. Inside fifth pipe 20A is disposed fifth magnetocaloric member 21A. Fifth magnetocaloric member 21A is held inside fifth pipe 20A.

Sixth pipe 20B is disposed in sixth gap 17B. When viewed in the Z direction, sixth pipe 20B has a longitudinal direction in the X direction and a shorter-side direction in the Y direction. Sixth pipe 20B has an outer peripheral surface spaced for example from a surface of each of centered magnetic pole 16 and sixth magnetic pole 13. Sixth pipe 20B may have the outer peripheral surface for example in contact with the surface of each of centered magnetic pole 16 and sixth magnetic pole 13. Inside sixth pipe 20B is disposed sixth magnetocaloric member 21B. Sixth magnetocaloric member 21B is held inside sixth pipe 20B.

Seventh pipe 20C is disposed in seventh gap 17C. When viewed in the Z direction, seventh pipe 20C has a longitudinal direction in the Y direction and a shorter-side direction in the X direction. Seventh pipe 20C has an outer peripheral surface spaced for example from a surface of each of centered magnetic pole 16 and seventh magnetic pole 14. Seventh pipe 20C may have the outer peripheral surface for example in contact with the surface of each of centered magnetic pole 16 and seventh magnetic pole 14. Inside seventh pipe 20C is disposed seventh magnetocaloric member 21C. Seventh magnetocaloric member 2C is held inside seventh pipe 20C.

Eighth pipe 20D is disposed in eighth gap 17D. When viewed in the Z direction, eighth pipe 20D has a longitudinal direction in the Y direction and a shorter-side direction in the X direction. Eighth pipe 20D has an outer peripheral surface spaced for example from a surface of each of centered magnetic pole 16 and eighth magnetic pole 15. Eighth pipe 20D may have the outer peripheral surface for example in contact with the surface of each of centered magnetic pole 16 and eighth magnetic pole 15. Inside eighth pipe 20D is disposed eighth magnetocaloric member 21D. Eighth magnetocaloric member 21D is held inside eighth pipe 20D.

Fifth, sixth, seventh, and eighth pipes 20A, 20B, 20C, and 20D each extend in the Z direction. Fifth, sixth, seventh, and eighth pipes 20A, 20B, 20C, and 20D are each a straight pipe, for example. Fifth, sixth, seventh, and eighth pipes 20A, 20B, 20C, and 20D may each for example be a reciprocating pipe formed of a plurality of straight pipes connected in series by a U-shaped pipe.

When electromagnet 100 for magnetic refrigeration is incorporated in magnetic refrigerator 200, fifth, sixth, seventh, and eighth pipes 20A, 20B, 20C, and 20D each have one and the other ends in the Z direction connected to an inflow/outflow pipe. When electromagnet 100 for magnetic refrigeration is incorporated in magnetic refrigerator 200, fifth, sixth, seventh, and eighth pipes 20A, 20B, 20C, and 20D pass a heat transport medium therethrough. The heat transport medium passes through each of fifth, sixth, seventh, and eighth pipes 20A, 20B, 20C, and 20D in the Z direction.

Fifth, sixth, seventh, and eighth magnetocaloric members 21A, 21B, 21C, and 21D are similar in configuration to first, second, third and fourth magnetocaloric members 10A, 10B, 10C and 10D.

A magnetic refrigerator according to the second embodiment is basically similar in configuration to magnetic refrigerator 200 according to the first embodiment except that the former differs from the latter in that the former comprises electromagnet 102 for magnetic refrigeration instead of electromagnet 100 for magnetic refrigeration.

In the magnetic refrigerator according to the second embodiment, electromagnet 102 for magnetic refrigeration has fifth, sixth, seventh, and eighth pipes 20A, 20B, 20C, and 20D connected to one another in parallel.

<Operation of Electromagnet for Magnetic Refrigeration>

Figure 14:
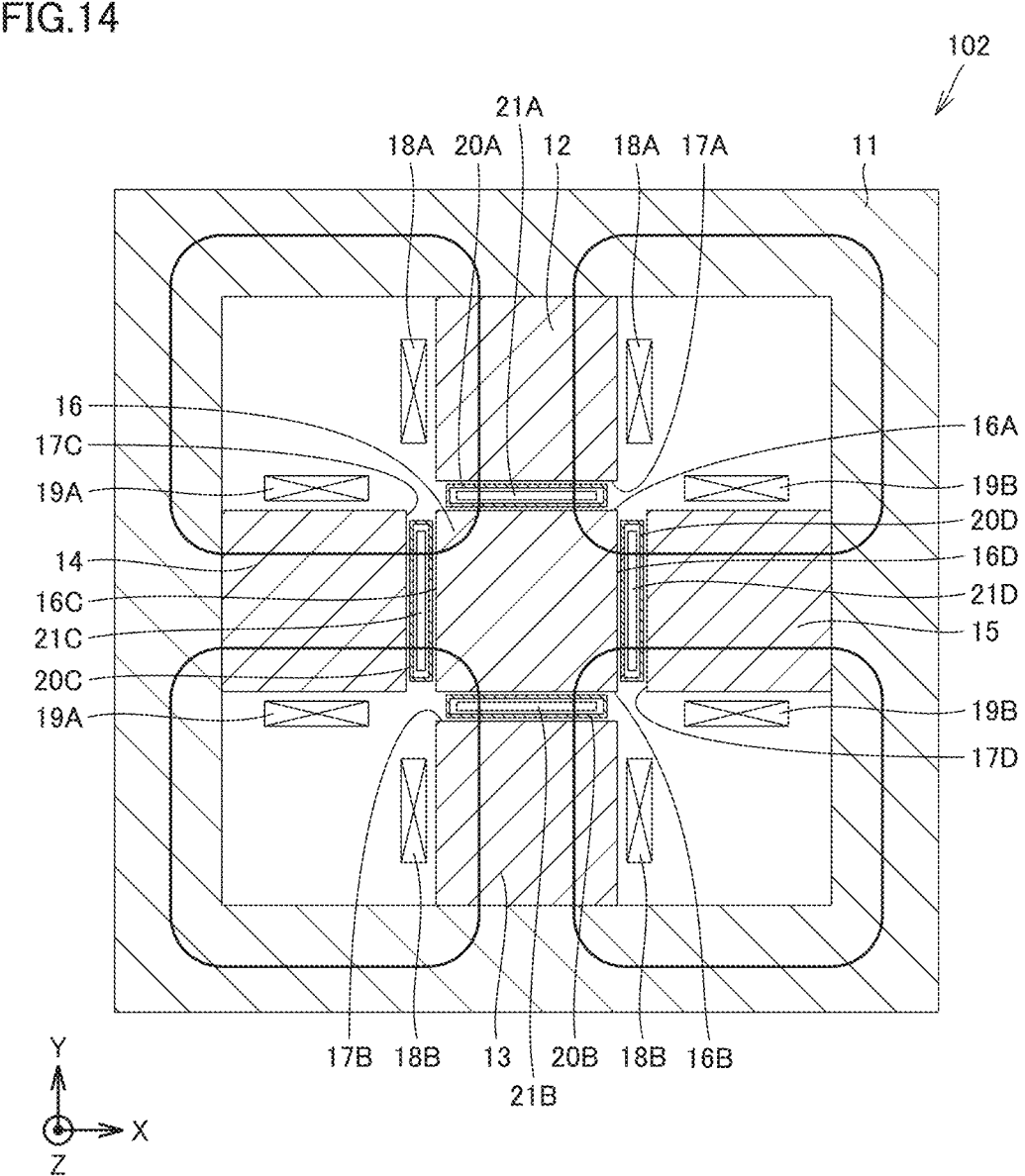
FIG. 14 is a diagram showing a fifth state of the electromagnet for magnetic refrigeration shown in FIG. 13.
Figure 15:
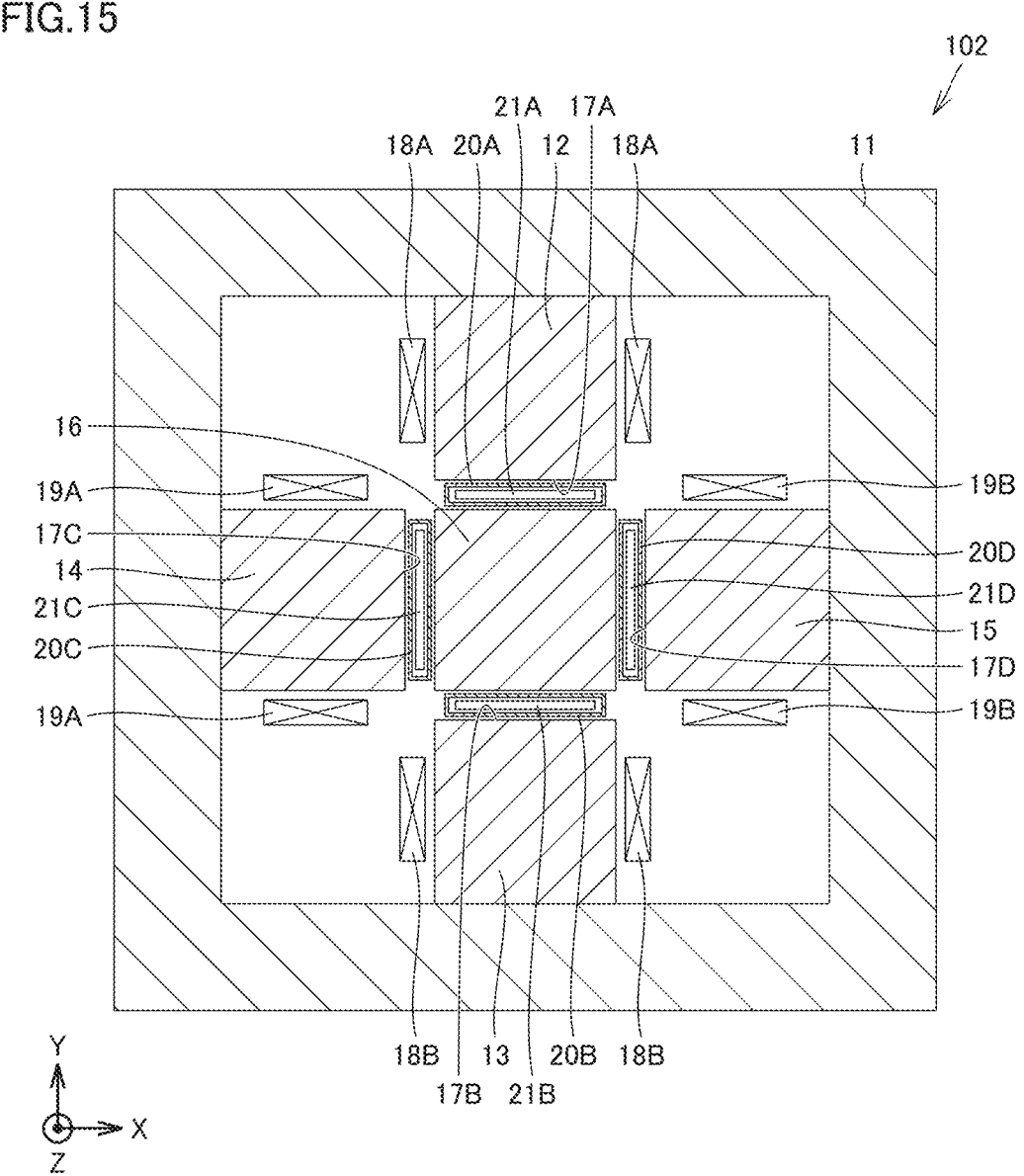
FIG. 15 is a diagram showing a sixth state of the electromagnet for magnetic refrigeration shown in FIG. 13.

In FIG. 14, electromagnet 102 for magnetic refrigeration is in the fifth state. That is, in FIG. 14, third, fourth, fifth and sixth coils 18A, 18B, 19A, and 19B are concurrently energized. In FIG. 15, electromagnet 102 for magnetic refrigeration is in the sixth state. That is, in FIG. 15, third, fourth, fifth and sixth coils 18A, 18B, 19A, and 19B are concurrently unenergized.

As shown in FIG. 14, in the fifth state, third and fourth coils 18A and 18B create a magnetic flux passing across fifth and sixth gaps 17A and 17B (a thick solid line indicates a line of magnetic induction), and fifth and sixth coils 19A and 19B create a magnetic flux passing across seventh and eighth gaps 17C and 17D.

Thus, fifth, sixth, seventh, and eighth magnetocaloric members 21A, 21B, 21C, and 21D generate heat, and the heat transport medium passing through each of fifth, sixth, seventh, and eighth pipes 20A, 20B, 20C, and 20D is heated.

As shown in FIG. 15, in the sixth state, no magnetic flux is formed across each of fifth, sixth, seventh, and eighth gaps 17A, 17B, 17C, and 17D. As a result, fifth, sixth, seventh, and eighth magnetocaloric members 21A, 21B, 21C, and 21D absorb heat, and the heat transport medium passing through each of fifth, sixth, seventh, and eighth pipes 20A, 20B, 20C, and 20D is cooled.

In the magnetic refrigerator according to the second embodiment, the fifth state shown in FIG. 14 and the sixth state shown in FIG. 15 are alternately and repeatedly switched. A pump performs the first operation in the fifth state and performs the second operation in the sixth state. In the fifth state, the heat transport medium heated at electromagnet 102 for magnetic refrigeration is delivered from electromagnet 102 for magnetic refrigeration to a first heat exchanger by the pump. Concurrently, the heat transport medium having absorbed heat of an external medium at a second heat exchanger is delivered to electromagnet 102 for magnetic refrigeration. Subsequently, the fifth state is switched to the sixth state. In the sixth state, the heat transport medium cooled at electromagnet 102 for magnetic refrigeration is delivered from electromagnet 102 for magnetic refrigeration to the second heat exchanger by the pump. Concurrently, the heat transport medium having dissipated heat at the first heat exchanger to the external medium is delivered to electromagnet 102 for magnetic refrigeration. Subsequently, the sixth state is switched to the fifth state.

<Function and Effect>

In electromagnet 102 for magnetic refrigeration, a magnetic field generated in fifth gap 17A between fifth magnetic pole 12 and centered magnetic pole 16 in the fifth state is stronger than a magnetic field generated inside an energized air core coil. Therefore, an amount of heat generated by fifth magnetocaloric member 21A disposed in fifth gap 17A in the fifth state is larger than an amount of heat generated by a magnetocaloric member disposed inside the energized air core coil. A difference in temperature of the fifth magnetocaloric member 21A between the firth state and the sixth state is larger than a difference in temperature of the magnetocaloric member disposed inside the energized air core coil therebetween. Sixth, seventh and eighth magnetocaloric members 21B, 21C and 21D are also similar to fifth magnetocaloric member 21A. As a result, an endothermic/exothermic effect of each of fifth, sixth, seventh, and eighth magnetocaloric members 21A, 21B, 21C, and 21D in electromagnet 102 for magnetic refrigeration is larger than that when a magnetocaloric member is disposed inside an air core coil.

Modified Example

Figure 16:
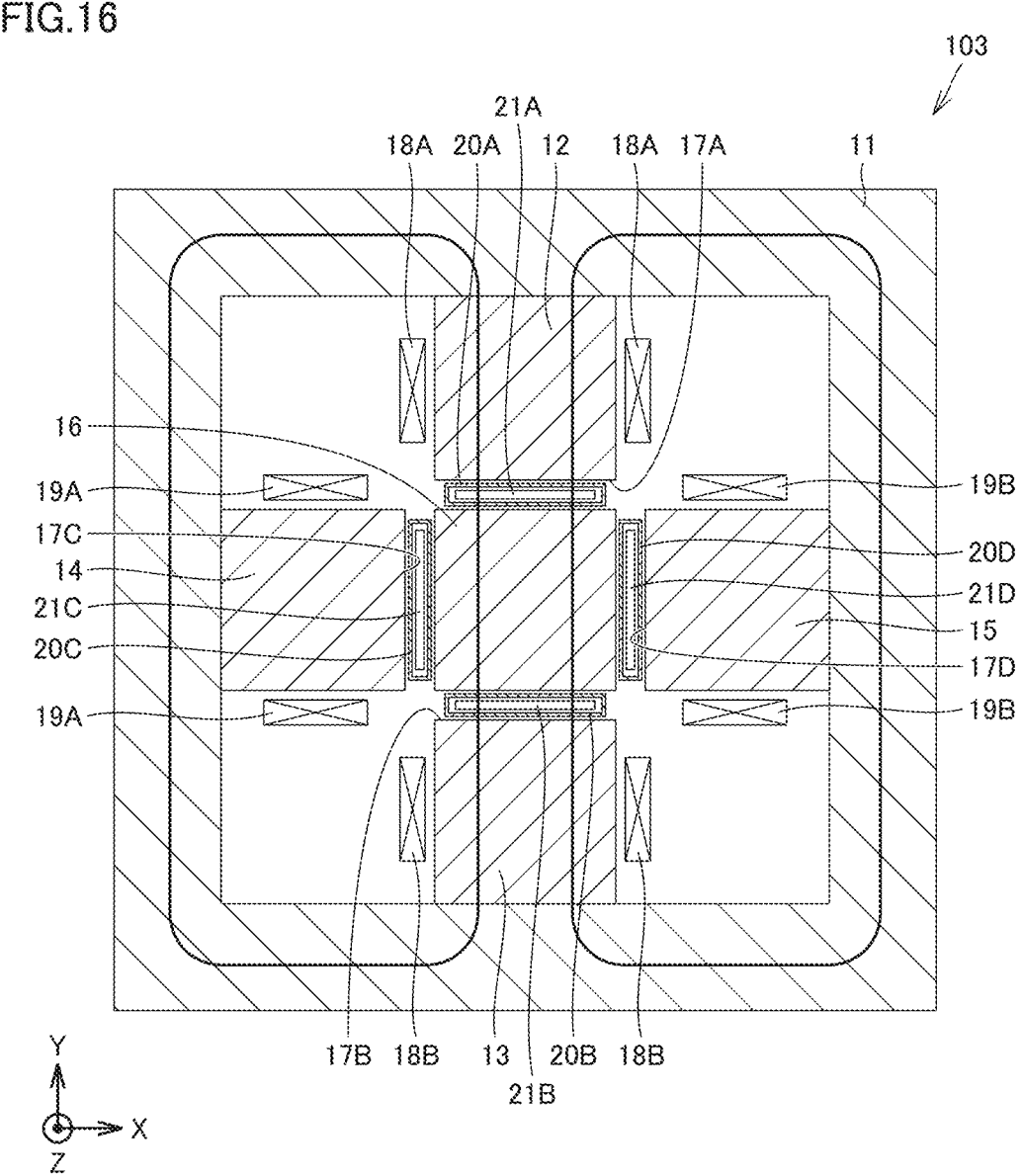
FIG. 16 is a diagram showing a seventh state of a modified example of the electromagnet for magnetic refrigeration shown in FIG. 13.
Figure 17:
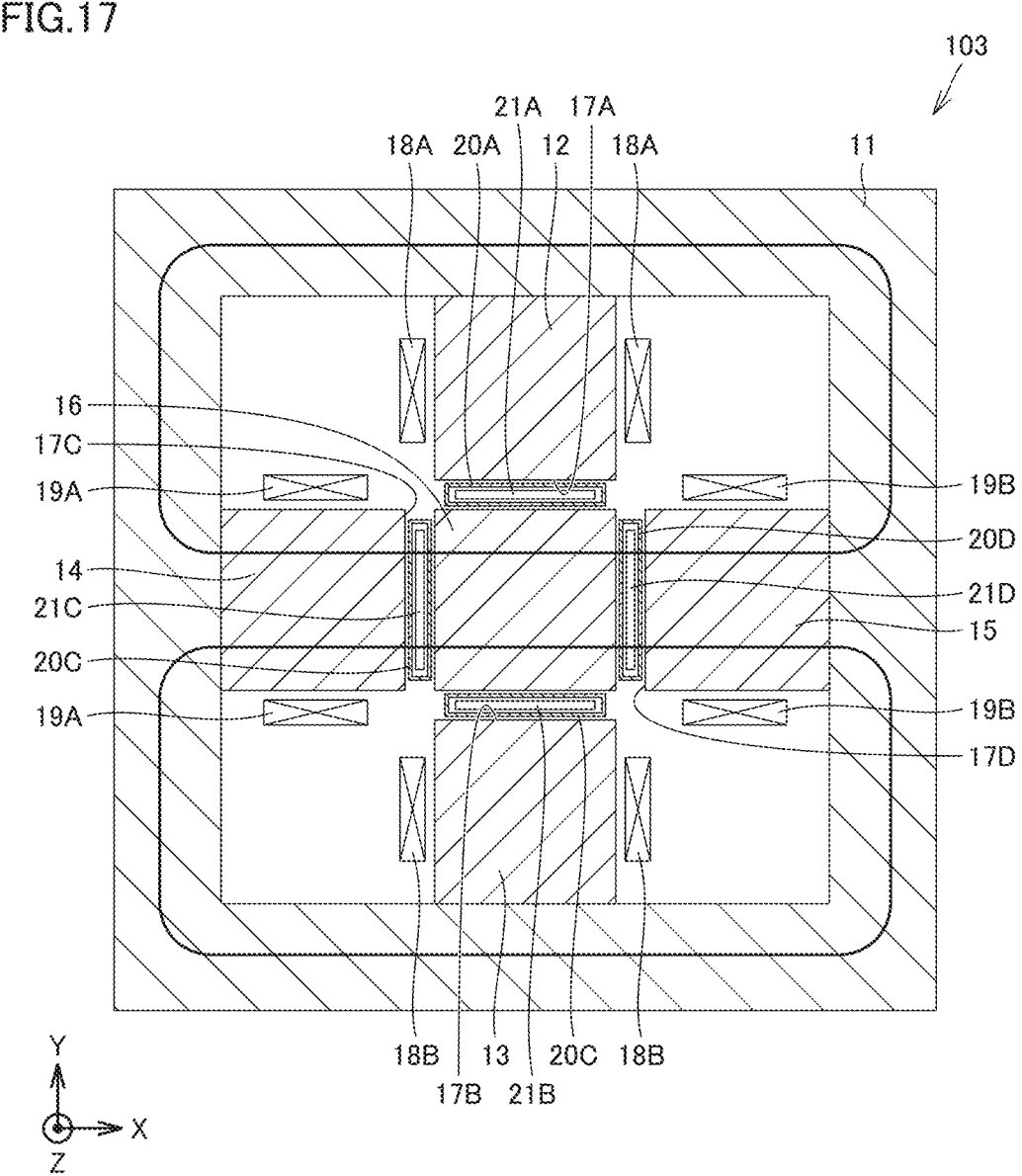
FIG. 17 is a diagram showing an eighth state of the modified example of the electromagnet for magnetic refrigeration shown in FIG. 13.

FIGS. 16 and 17 are diagrams showing an electromagnet 103 for magnetic refrigeration that is a modified example of electromagnet 102 for magnetic refrigeration.

In electromagnet 103 for magnetic refrigeration, third and fourth coils 18A and 18B and fifth and sixth coils 19A and 19B are alternately energized. In other words, the power source switches a seventh state in which third and fourth coils 18A and 18B are energized and fifth and sixth coils 19A and 19B are unenergized (see FIG. 16) to an eighth state in which third and fourth coils 18A and 18B are unenergized and fifth and sixth coils 19A and 19B are energized (see FIG. 17), and vice versa.

In FIG. 16, electromagnet 103 for magnetic refrigeration is in the seventh state. That is, in FIG. 16, third and fourth coils 18A and 18B are energized, and fifth and sixth coils 19A and 19B are unenergized. In FIG. 17, electromagnet 103 for magnetic refrigeration is in the eighth state. That is, in FIG. 17, third and fourth coils 18A and 18B are unenergized, and fifth and sixth coils 19A and 19B are energized.

As shown in FIG. 16, in the seventh state, third and fourth coils 18A and 18B create a magnetic flux passing across fifth and sixth gaps 17A and 17B (a thick solid line indicates a line of magnetic induction). As a result, fifth and sixth magnetocaloric members 21A and 21B generate heat, and the heat transport medium passing through fifth and sixth pipes 20A and 20B is heated. In the seventh state, no magnetic flux is formed across seventh and eighth gaps 17C and 17D. As a result, seventh and eighth magnetocaloric members 21C and 21D absorb heat, and the heat transport medium passing through seventh and eighth pipes 20C and 20D is cooled.

As shown in FIG. 17, in the eighth state, fifth and sixth coils 19A and 19B create a magnetic flux passing across seventh and eighth gaps 17C and 17D. As a result, seventh and eighth magnetocaloric members 21C and 21D generate heat, and the heat transport medium passing through seventh and eighth pipes 20C and 20D is heated. In the eighth state, no magnetic flux is formed across fifth and sixth gaps 17A and 17B. As a result, fifth and sixth magnetocaloric members 21A and 21B absorb heat, and the heat transport medium passing through fifth and sixth pipes 20A and 20B is cooled.

A magnetic refrigerator comprising electromagnet 103 for magnetic refrigeration shown in FIGS. 16 and 17 is basically similar in configuration to magnetic refrigerator 201 comprising electromagnet 101 for magnetic refrigeration shown in FIGS. 11 and 12, except that the former differs from the latter in that the former comprises electromagnet 103 for magnetic refrigeration instead of electromagnet 101 for magnetic refrigeration.

The magnetic refrigerator comprising electromagnet 103 for magnetic refrigeration comprises a heat pump of a first system and a heat pump of a second system. The heat pump of the first system is independent of the heat pump of the second system.

The heat pump of the first system includes fifth and sixth pipes 20A and 20B of electromagnet 103 for magnetic refrigeration, a first heat exchanger, a second heat exchanger, and a pump. The heat pump of the first system does not include seventh and eighth pipes 20C and 20D of electromagnet 103 for magnetic refrigeration.

The heat pump of the first system has fifth and sixth pipes 20A and 20B connected to each other in parallel. The first heat transport medium is split into fifth and sixth pipes 20A and 20B in electromagnet 103 for magnetic refrigeration. In the heat pump of the first system, the pump performs the first operation when electromagnet 103 for magnetic refrigeration is in the seventh state, and the pump performs the second operation when electromagnet 103 for magnetic refrigeration is in the eighth state. Electromagnet 103 for magnetic refrigeration alternately repeats the seventh state and the eighth state. The pump alternately repeats the first operation and the second operation.

The first heat transport medium heated at electromagnet 103 for magnetic refrigeration in the seventh state is delivered from electromagnet 103 for magnetic refrigeration to the first heat exchanger by the pump. Concurrently, the first heat transport medium having absorbed heat of an external medium at the second heat exchanger is delivered to electromagnet 103 for magnetic refrigeration. Subsequently, the seventh state is switched to the eighth state. The first heat transport medium cooled at electromagnet 103 for magnetic refrigeration in the eighth state is delivered from electromagnet 103 for magnetic refrigeration to the second heat exchanger by the pump. Concurrently, the first heat transport medium having dissipated heat at the first heat exchanger to the external medium is delivered to electromagnet 103 for magnetic refrigeration. Subsequently, the eighth state is switched to the seventh state.

The heat pump of the second system includes seventh and eighth pipes 20C and 20D of electromagnet 103 for magnetic refrigeration, a third heat exchanger, a fourth heat exchanger, and a pump. The heat pump of the second system does not include fifth and sixth pipes 20A and 20B. The heat pump of the second system has seventh and eighth pipes 20C and 20D connected to each other in parallel. In the heat pump of the second system, the second pump performs the first operation when electromagnet 103 for magnetic refrigeration is in the eighth state, and the second pump performs the second operation when electromagnet 103 for magnetic refrigeration is in the seventh state.

The second heat transport medium cooled at electromagnet 103 for magnetic refrigeration in the seventh state is delivered from electromagnet 103 for magnetic refrigeration to the fourth heat exchanger by the second pump. Concurrently, the second heat transport medium having dissipated heat at the third heat exchanger to the external medium is delivered to electromagnet 103 for magnetic refrigeration. Subsequently, the seventh state is switched to the eighth state. The second heat transport medium heated at electromagnet 103 for magnetic refrigeration in the eighth state is delivered from electromagnet 103 for magnetic refrigeration to the third heat exchanger by the second pump. Concurrently, the second heat transport medium having absorbed heat of the external medium at the fourth heat exchanger is delivered to electromagnet 103 for magnetic refrigeration. Subsequently, the eighth state is switched to the seventh state.

Electromagnet 103 for magnetic refrigeration basically having a configuration similar to that of electromagnet 102 for magnetic refrigeration can be as effective as electromagnet 102 for magnetic refrigeration.

Further, for a ground similar to that for magnetic refrigerator 201 comprising electromagnet 101 for magnetic refrigeration, the magnetic refrigerator comprising electromagnet 103 for magnetic refrigeration can be smaller in size than the magnetic refrigerator comprising two electromagnets 102 for magnetic refrigeration or two electromagnets for magnetic refrigeration according to the comparative example.

Further, electromagnet 103 for magnetic refrigeration in the magnetic refrigerator can heat the first heat transport medium of one heat pump and concurrently cool the second heat transport medium of the other heat pump. Electromagnet 103 for magnetic refrigeration is thus higher in efficiency than electromagnet 102 for magnetic refrigeration.

Third Embodiment

Figure 18:
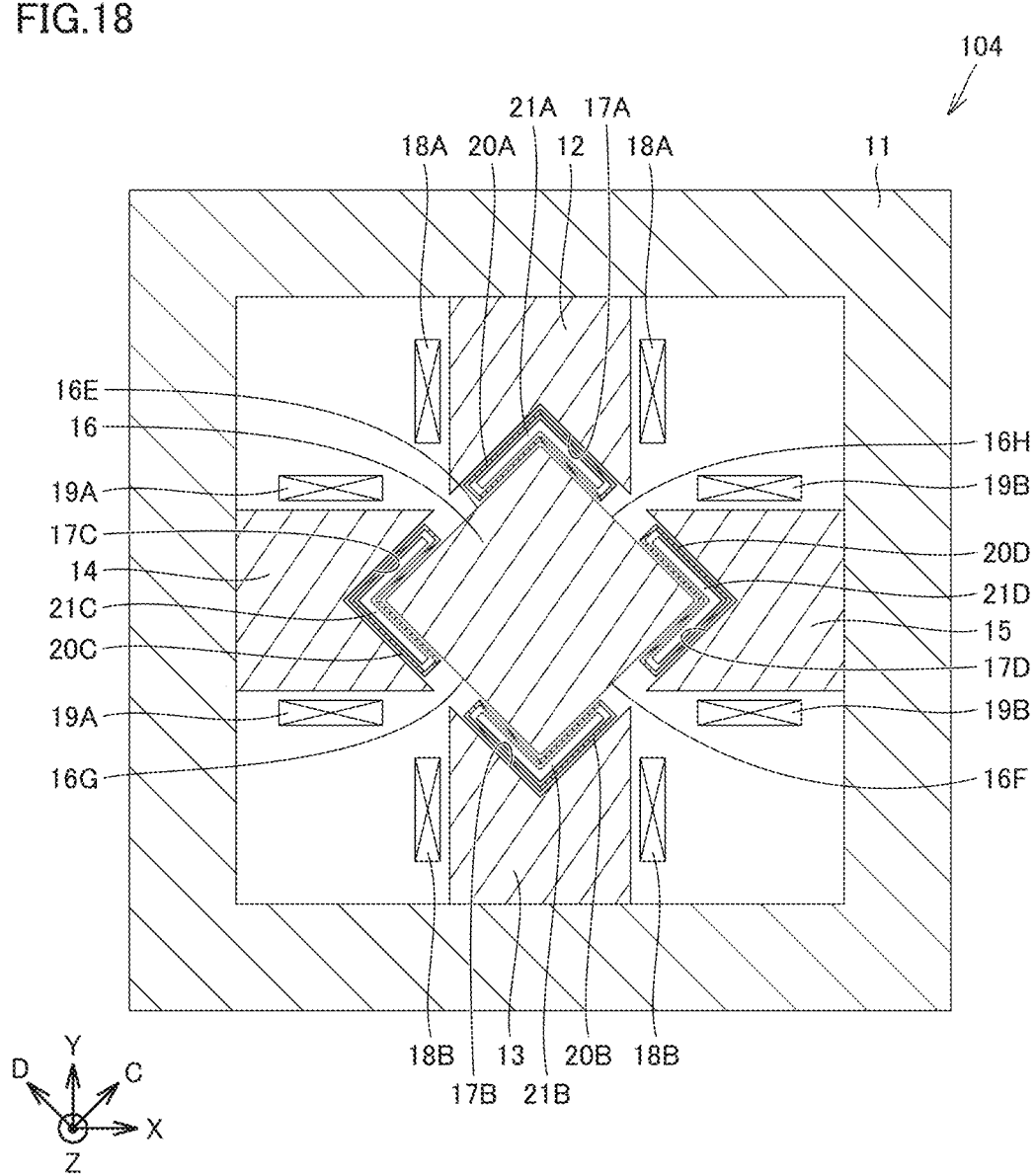
FIG. 18 is a diagram showing an electromagnet for magnetic refrigeration according to a third embodiment.
Figure 19:
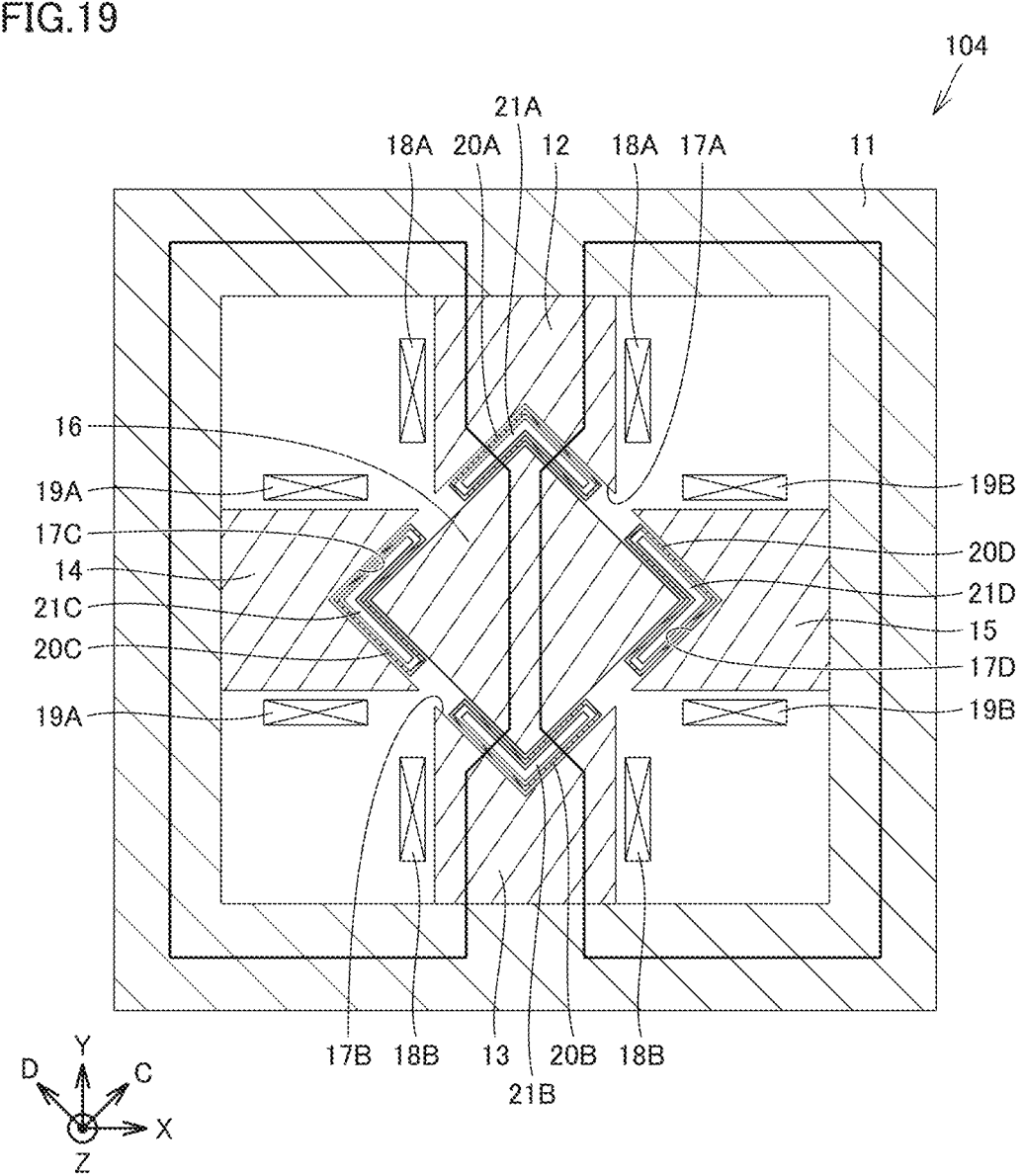
FIG. 19 is a diagram showing a seventh state of the electromagnet for magnetic refrigeration shown in FIG. 18.
Figure 20:
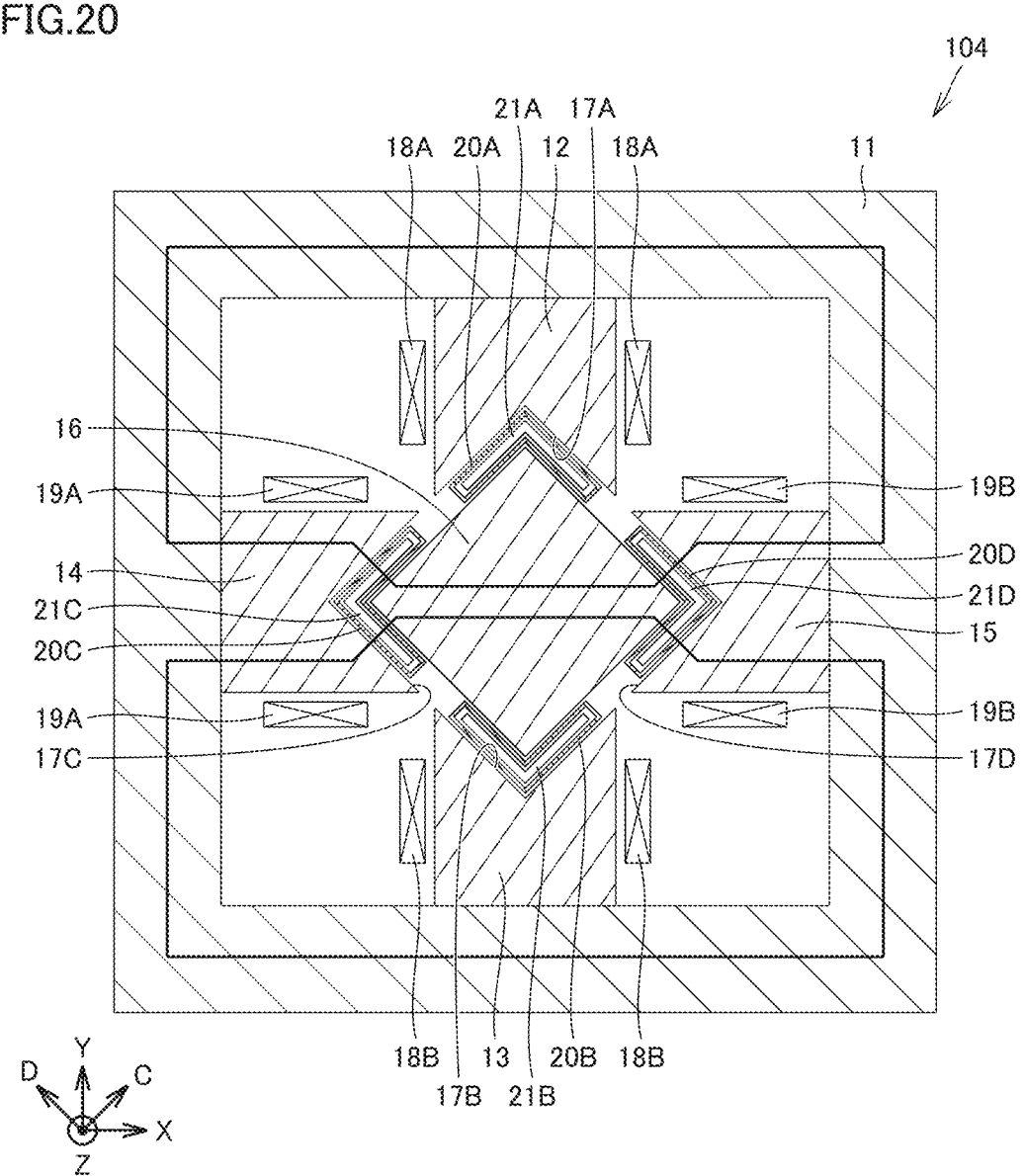
FIG. 20 is a diagram showing an eighth state of the electromagnet for magnetic refrigeration shown in FIG. 18.

As shown in FIGS. 18 to 20, an electromagnet 104 for magnetic refrigeration according to a third embodiment is basically similar in configuration to electromagnet 102 for magnetic refrigeration according to the second embodiment, except that the former differs from the latter in that the former has centered magnetic pole 16 rotated by 45 degrees with respect to a central axis extending in the Z direction.

Note that FIGS. 18 to 20 indicate a fifth direction C and a sixth direction D inclined with respect to the X direction (a fourth direction) and the Y direction (a third direction). Fifth direction C intersects sixth direction D, and is orthogonal to sixth direction D, for example. While fifth direction C may be inclined with respect to the X direction and the Y direction at any angle, the angle is preferably 45 degrees when viewed in the Z direction in view of suppressing saturation of each of fifth, sixth, seventh, and eighth magnetic poles 12, 13, 14, and 15.

From a different viewpoint, centered magnetic pole 16 has a fifth surface 16E, a sixth surface 16F, a seventh surface 16G, and an eighth surface 16H instead of first, second, third, and fourth surfaces 16A, 16B, 16C, and 16D shown in FIG. 13.

Fifth surface 16E extends in fifth direction C. Fifth surface 16E faces a portion of fifth gap 17A and a portion of seventh gap 17C.

Sixth surface 16F extends in fifth direction C. Sixth surface 16F faces a portion of sixth gap 17B and a portion of eighth gap 17D.

Seventh surface 16G extends in sixth direction D. Seventh surface 16O faces each of a remainder of sixth gap 17B and a remainder of seventh gap 17C.

Eighth surface 16H extends in sixth direction D. Eighth surface 16H faces each of a remainder of fifth gap 17A and a remainder of eighth gap 17D.

One end of fifth surface 16E in fifth direction C is connected to one end of seventh surface 16O in sixth direction D, and the other end of fifth surface 16E in fifth direction C is connected to one end of eighth surface 16H in sixth direction D. One end of sixth surface 16F in fifth direction C is connected to the other end of seventh surface 16O in sixth direction D, and the other end of sixth surface 16F in fifth direction C is connected to the other end of eighth surface 16H in sixth direction D.

When viewed in the Z direction, fifth, sixth, seventh and eighth magnetic poles 12, 13, 14 and 15 each have a planar shape with a recess. Fifth, sixth, seventh, and eighth magnetic poles 12, 13, 14, and 15 each have a flat surface extending in fifth direction C and a flat surface extending in sixth direction D.

Fifth gap 17A provides spacing between the flat surface of fifth magnetic pole 12 extending in fifth direction C and fifth surface 16E of centered magnetic pole 16 and between the flat surface of fifth magnetic pole 12 extending in sixth direction D and eighth surface 16H of centered magnetic pole 16.

Sixth gap 17B provides spacing between the flat surface of sixth magnetic pole 13 extending in fifth direction C and sixth surface 16F of centered magnetic pole 16, and between the flat surface of sixth magnetic pole 13 extending in sixth direction D and seventh surface 16G of centered magnetic pole 16.

Seventh gap 17C provides spacing between the flat surface of seventh magnetic pole 14 extending in fifth direction C and fifth surface 16E of centered magnetic pole 16 and between the flat surface of seventh magnetic pole 14 extending in sixth direction D and seventh surface 16G of centered magnetic pole 16.

Eighth gap 17D provides spacing between the flat surface of eighth magnetic pole 15 extending in fifth direction C and sixth surface 16F of centered magnetic pole 16 and between the flat surface of eighth magnetic pole 15 extending in sixth direction D and eighth surface 16H of centered magnetic pole 16.

Electromagnet 104 for magnetic refrigeration can be driven in a manner similar to that in which electromagnet 102 for magnetic refrigeration is driven. Specifically, electromagnet 104 for magnetic refrigeration repeats the seventh state shown in FIG. 19 and the eighth state shown in FIG. 20. In this case, electromagnet 104 for magnetic refrigeration can be as effective as electromagnet 102 for magnetic refrigeration. Further, electromagnet 104 for magnetic refrigeration can also be driven in a manner similar to that in which electromagnet 103 for magnetic refrigeration is driven. In this case, electromagnet 104 for magnetic refrigeration can be as effective as electromagnet 102 for magnetic refrigeration.

Further, a length of fifth gap 17A in the longitudinal direction for electromagnet 104 for magnetic refrigeration is longer than a length of fifth gap 17A in the longitudinal direction for each of electromagnets 102 and 103 for magnetic refrigeration, and the former is, for example, $\sqrt{2}$ times the latter. Thus, an endothermic/exothermic effect of each of fifth, sixth, seventh, and eighth magnetocaloric members 21A, 21B, 21C, and 21D in electromagnet 104 for magnetic refrigeration is larger than that in electromagnets 102 and 103 for magnetic refrigeration.

Fourth Embodiment

Figure 21:
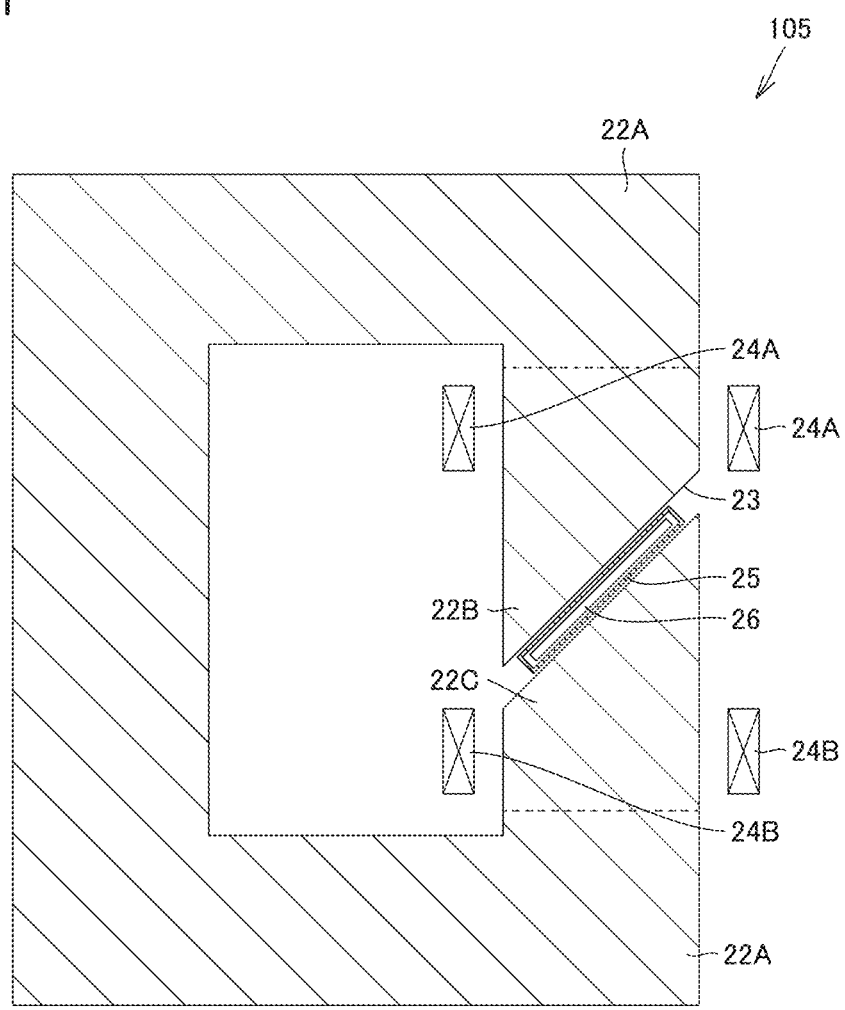
FIG. 21 is a diagram showing an electromagnet for magnetic refrigeration according to a fourth embodiment.

As shown in FIG. 21, an electromagnet 105 for magnetic refrigeration according to a fourth embodiment comprises a return yoke 22A, a ninth magnetic pole 22B, a tenth magnetic pole 22C, a seventh coil 24A, and an eighth coil 24B.

Return yoke 22A is formed with ninth and tenth magnetic poles 22B and 22C in one piece. When viewed in the Z direction, return yoke 21 has a planar shape for example in the form of a letter C. Return yoke 22A has a portion extending in the X direction and a portion extending in the Y direction orthogonal to the X direction. Each portion of return yoke 22A extends in the Z direction orthogonal to each of the X direction and the Y direction. Note that FIG. 21 indicates a seventh direction E and an eighth direction F inclined with respect to the X direction and the Y direction. Seventh direction E intersects eighth direction F, and is orthogonal to eighth direction F, for example. While seventh direction E may be inclined with respect to the X direction and the Y direction at any angle, the angle is preferably 45 degrees in view of suppressing saturation of each of ninth and tenth magnetic poles 22B and 22C.

Ninth magnetic pole 22B is connected to one end of return yoke 22A. Tenth magnetic pole 22C is connected to the other end of return yoke 22A. Ninth magnetic pole 22B is spaced from tenth magnetic pole 22C by ninth gap 23. Ninth and tenth magnetic poles 22B and 22C each have a surface extending in seventh direction E.

Seventh coil 24A surrounds ninth magnetic pole 22B in the X direction. Eighth coil 24B surrounds tenth magnetic pole 22C in the X direction. Seventh and eighth coils 24A and 24B have their respective central axes extending in the Y direction.

Seventh and eighth coils 24A and 24B are each connected to a power source (power source 114 in FIG. 3). Seventh and eighth coils 24A and 24B are concurrently energized or concurrently unenergized. In other words, the power source switches a state in which seventh and eighth coils 24A and 24B are concurrently energized to a state in which seventh and eighth coils 24A and 24B are concurrently unenergized, and vice versa.

Ninth gap 23 faces ninth magnetic pole 22B at a surface extending in seventh direction E and faces tenth magnetic pole 22C at surface extending in seventh direction E. As shown in FIG. 21, when viewed in the Z direction, ninth gap 23 has a longitudinal direction in seventh direction E and a shorter-side direction in eighth direction F.

As shown in FIG. 21, electromagnet 105 for magnetic refrigeration further comprises a ninth pipe 25 and a ninth magnetocaloric member 26.

Ninth pipe 25 is disposed in ninth gap 23. When viewed in the Z direction, ninth pipe 25 has a longitudinal direction in seventh direction E and a shorter-side direction in eighth direction F. Ninth pipe 25 has an outer peripheral surface spaced for example from a surface of each of ninth and tenth magnetic poles 22B and 22C. Ninth pipe 25 may have the outer peripheral surface for example in contact with the surface of each of ninth and tenth magnetic poles 22B and 22C. Inside ninth pipe 25 is disposed ninth magnetocaloric member 26. Ninth magnetocaloric member 26 is held inside ninth pipe 25.

Ninth magnetocaloric member 26 is similar in configuration to first magnetocaloric member 10A. Such an electromagnet 105 for magnetic refrigeration can also be as effective as electromagnet 100 for magnetic refrigeration.

In other words, an endothermic/exothermic effect of ninth magnetocaloric member 26 in electromagnet 105 for magnetic refrigeration is larger than that when a magnetocaloric member is disposed inside an air core coil.

Further, electromagnet 105 for magnetic refrigeration has ninth and tenth magnetic poles 22B and 22C each facing ninth gap 23 in an area which is √2 times such an area for the electromagnet for magnetic refrigeration according to the comparative example described above, and electromagnet 105 for magnetic refrigeration passes inside ninth gap 23 a magnetic flux that is √2 times that passing inside a gap of the comparative example. As a result, an endothermic/exothermic effect of ninth magnetocaloric member 26 in electromagnet 105 for magnetic refrigeration is larger than that in the electromagnet for magnetic refrigeration according to the comparative example.

Modified Example

Figure 22:
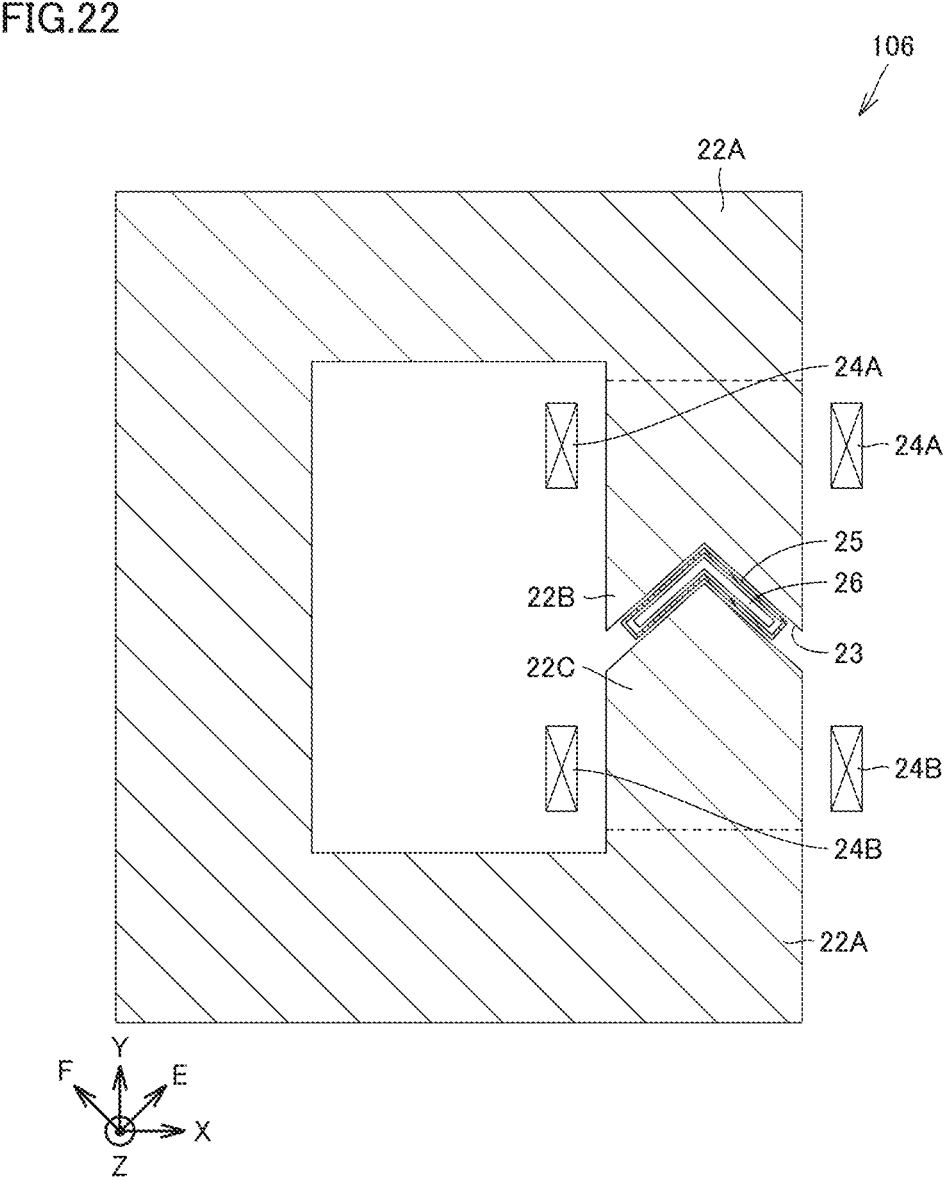
FIG. 22 is a diagram showing a modified example of the electromagnet for magnetic refrigeration according to the fourth embodiment.

FIG. 22 is a diagram showing an electromagnet 106 for magnetic refrigeration that is a modified example of electromagnet 105 for magnetic refrigeration. Electromagnet 106 for magnetic refrigeration is basically similar in configuration to electromagnet 105 for magnetic refrigeration, except that the former differs from the latter in that the former comprises ninth and tenth magnetic poles 22B and 22C each having a surface extending in seventh direction E and a surface extending in eighth direction F.

When viewed in the Z direction, ninth magnetic pole 22B is formed, for example, in a recessed shape. When viewed in the Z direction, tenth magnetic pole 22C is formed, for example, in a projecting shape.

Ninth gap 23 has a first region facing a surface of ninth magnetic pole 22B extending in seventh direction E and a surface of tenth magnetic pole 22C extending in seventh direction E, and a second region facing a surface of ninth magnetic pole 22B extending in eighth direction F and a surface of tenth magnetic pole 22C extending in eighth direction F. As shown in FIG. 22, when viewed in the Z direction, the first region of ninth gap 23 has a longitudinal direction in seventh direction E and a shorter-side direction in eighth direction F. When viewed in the Z direction, the second region of ninth gap 23 has a longitudinal direction in eighth direction F and a shorter-side direction in seventh direction E.

Electromagnet 106 thus provided for magnetic refrigeration can also be as effective as electromagnet 105 for magnetic refrigeration.

Fifth Embodiment

Figure 23:
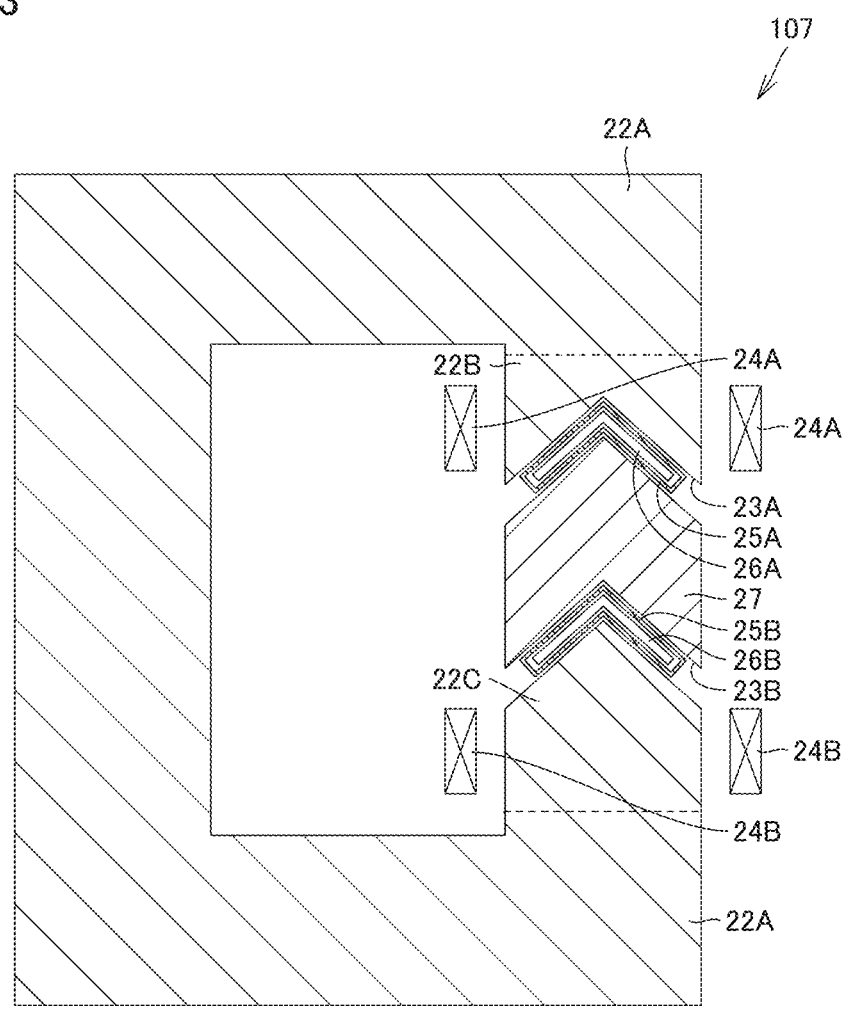
FIG. 23 is a diagram showing an electromagnet for magnetic refrigeration according to a fifth embodiment.

As shown in FIG. 23, an electromagnet 107 for magnetic refrigeration according to a fifth embodiment is basically similar in configuration to electromagnet 106 for magnetic refrigeration according to the fourth embodiment, except that the former differs from the latter in that the former further comprises an eleventh magnetic pole 27.

Eleventh magnetic pole 27 is disposed between ninth and tenth magnetic poles 22B and 22C in the Y direction. Eleventh magnetic pole 27 is spaced from ninth magnetic pole 22B in the Y direction by ninth gap 23A, and spaced from tenth magnetic pole 22C in the Y direction by tenth gap 23B.

Electromagnet 107 for magnetic refrigeration basically having a configuration similar to that of electromagnet 106 for magnetic refrigeration can be as effective as electromagnet 106 for magnetic refrigeration. Note that while electromagnet 107 for magnetic refrigeration has a number of gaps which is twice that for electromagnet 106 for magnetic refrigeration and hence requires magnetomotive force which is twice that for electromagnet 106 for magnetic refrigeration, the former can also have a number of magnetocaloric members which is twice that for the latter. Thus, electromagnet 107 for magnetic refrigeration can generally have an endothermic/exothermic effect equivalent to that of electromagnet 106 for magnetic refrigeration.

Sixth Embodiment

Figure 24:
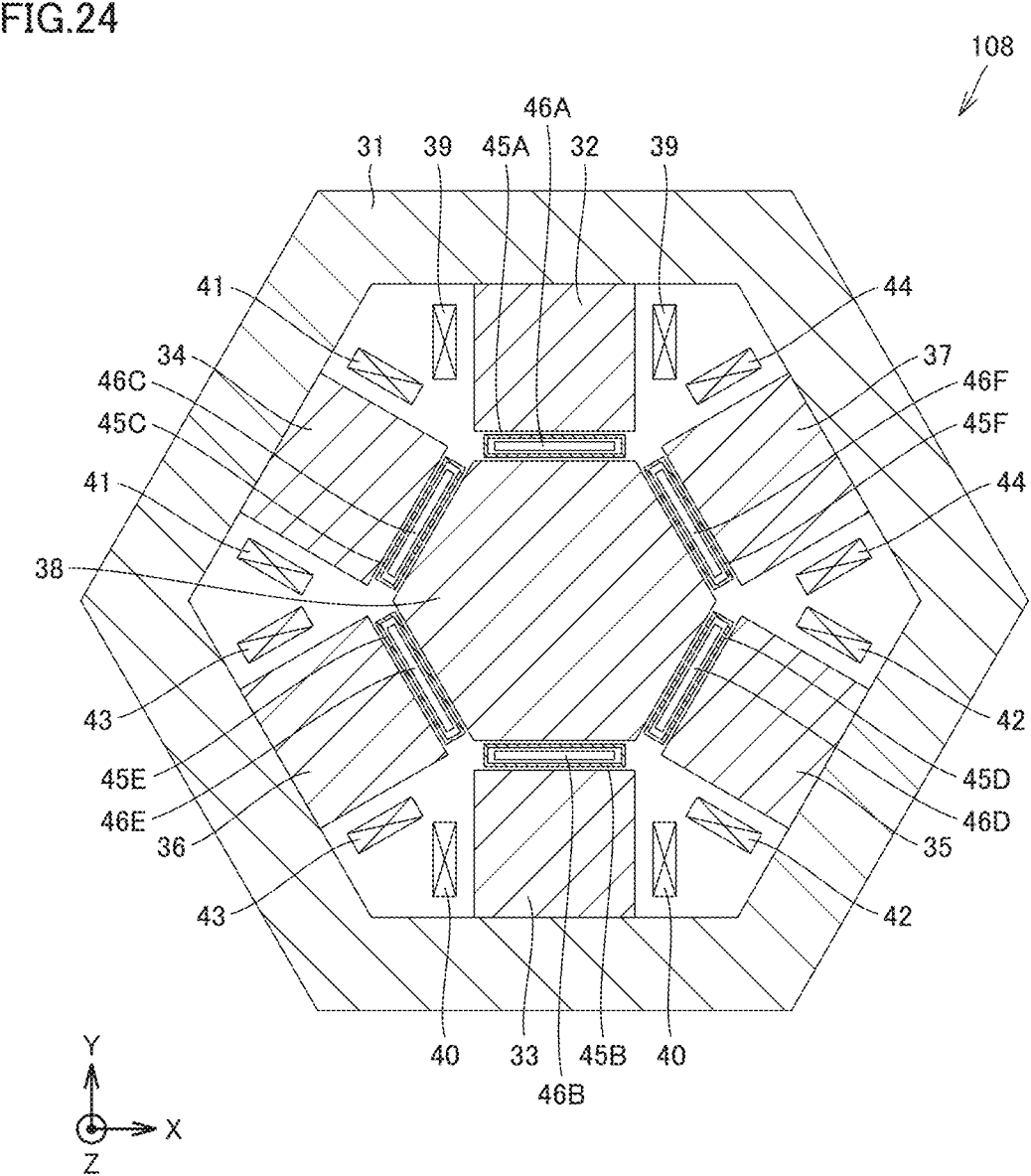
FIG. 24 is a diagram showing an electromagnet for magnetic refrigeration according to a sixth embodiment.

As shown in FIG. 24, an electromagnet 108 for magnetic refrigeration according to a sixth embodiment is basically similar in configuration to electromagnet 102 for magnetic refrigeration according to the second embodiment, except that the former differs from the latter in that the former comprises a return yoke 31 in the form of a hexagonal ring.

Electromagnet 108 for magnetic refrigeration comprises return yoke 31, six magnetic poles 32 to 37, a centered magnetic pole 38, and six coils 39 to 44.

Six magnetic poles 32 to 37 are each disposed inside return yoke 31. Six magnetic poles 32 to 37 are magnetically coupled to return yoke 31.

As shown in FIG. 24, six magnetic poles 32 to 37 are each spaced from centered magnetic pole 38 by a gap. Magnetic poles 32 and 33 are disposed so as to sandwich centered magnetic pole 38. Magnetic poles 34 and 35 are disposed so as to sandwich centered magnetic pole 38. Magnetic poles 36 and 37 are disposed so as to sandwich centered magnetic pole 38.

For electromagnet 108 for magnetic refrigeration, each of six magnetic poles 32 to 37 and centered magnetic pole 38 form a pair of opposite magnetic poles spaced by one of six gaps. That is, electromagnet 108 for magnetic refrigeration has six pairs of opposite magnetic poles. When viewed in the Z direction, six magnetic poles 32 to 37 each have a planar shape for example in the form of a square. When viewed in the Z direction, centered magnetic pole 38 has a planar shape in the form of a hexagon.

Six coils 39 to 44 each surround one of six magnetic poles 32 to 37. Six coils 39 to 44 may be divided into three pairs of coils based on the directions in which their respective central axes extend. Coils 39 and 40 of a first pair have their respective axes extending in the Y direction. Coils 41 and 42 of a second pair have their respective axes extending in a direction inclined by 30 degrees with respect to the Y direction. Coils 43 and 44 of a third pair have their respective axes extending in a direction inclined by 60 degrees with respect to the Y direction.

Figure 25:
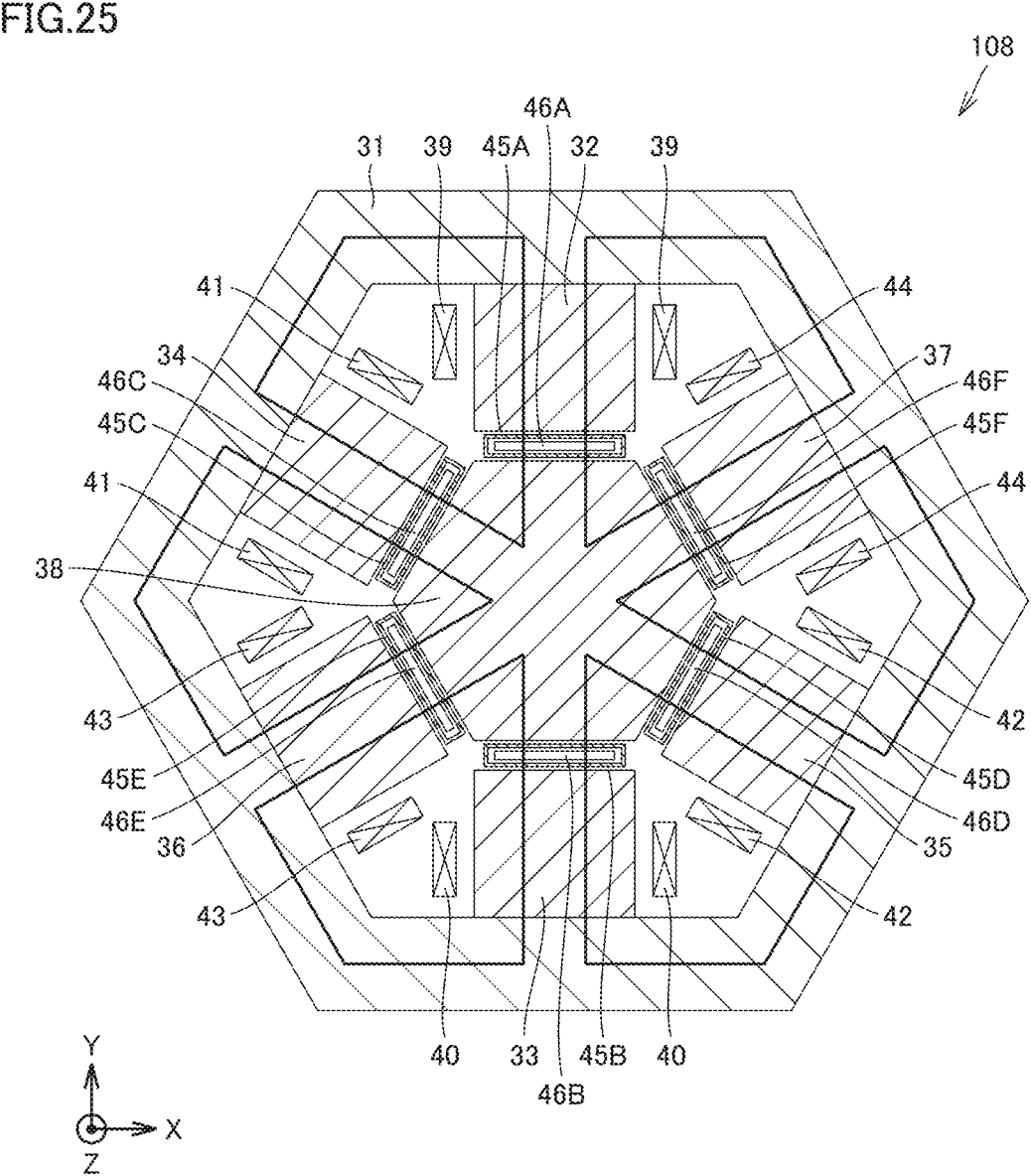
FIG. 25 is a diagram showing a ninth state of the magnet for magnetic refrigeration according to the sixth embodiment.
Figure 26:
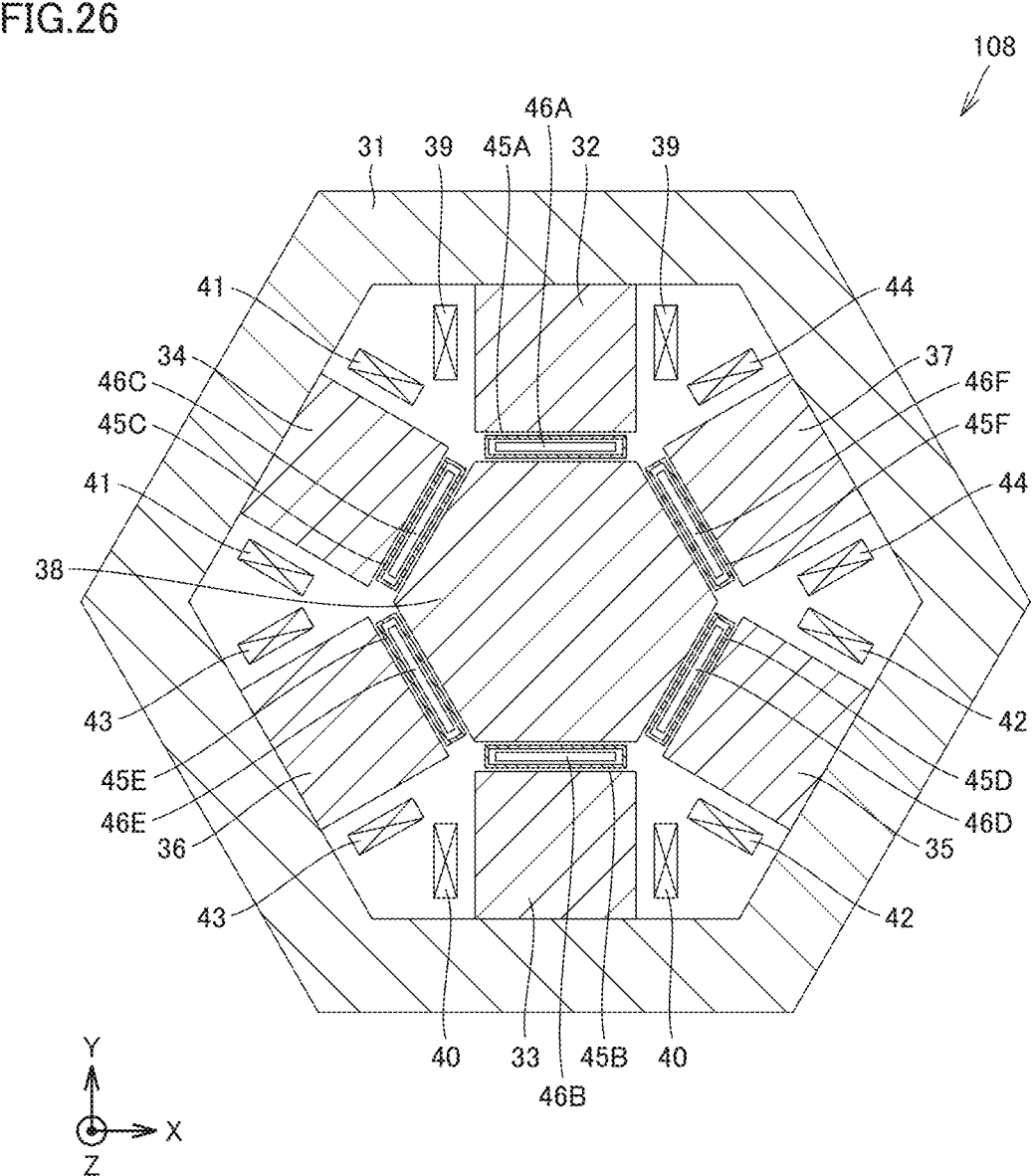
FIG. 26 is a diagram showing a tenth state of the magnet for magnetic refrigeration according to the sixth embodiment.

Six coils 39 to 44 are each connected to a power source (power source 114 in FIG. 3). Six coils 39 to 44 are, for example, concurrently energized or concurrently unenergized. In other words, the power source switches a ninth state in which six coils 39 to 44 are each energized concurrently (see FIG. 25) to a tenth state in which six coils 39 to 44 are each unenergized concurrently (see FIG. 26), and vise versa.

In each of the six gaps are disposed a pipe extending in the Z direction and a magnetocaloric member disposed inside the pipe.

While such an electromagnet 108 for magnetic refrigeration can be as effective as electromagnet 102 for magnetic refrigeration, the former has a larger number of magnetocaloric members than the latter, and hence generally has an endothermic/exothermic effect larger than the latter.

Electromagnet 108 for magnetic refrigeration may be driven in a manner similar to that in which electromagnet 102 for magnetic refrigeration shown in FIGS. 14 and 15 is driven. For example, three states in which the coils of only one of the three pairs of coils are energized concurrently and the coils of the other two pairs are unenergized concurrently may be switched. Further, a state in which the coils of only two of the three pairs of coils are energized concurrently and the coils of the other one pair are unenergized concurrently, and a state in which the coils of only the other one pair are energized concurrently and the coils of the other two pairs are unenergized concurrently may be switched.

Electromagnets 100, 101 and 103-107 for magnetic refrigeration may also have their return yokes in the form of a hexagonal ring when viewed in the Z direction.

While embodiments of the present disclosure have been described above, the above-described embodiments can be modified variously. Further, the scope of the present disclosure is not limited to the above-described embodiments. The scope of the present disclosure is defined by the terms of the claims, and is intended to include any modifications within the meaning and scope equivalent to the terms of the claims.

REFERENCE SIGNS LIST 1, 11, 21, 22A, 31 return yoke, 2 first magnetic pole, 2A, 3A, 4A first portion, 2B, 3B, 4B, 5B second portion, 3 second magnetic pole, 4 third magnetic pole, 5 fourth magnetic pole, 6A first gap, 6B second gap, 6C third gap, 6D fourth gap, 6E center gap, 7, 8, 39, 40, 41, 42, 43, 44 coil, 9A first pipe, 9B second pipe, 9C third pipe, 9D fourth pipe, 10A first magnetocaloric member, 10B second magnetocaloric member, 10C third magnetocaloric member, 10D fourth magnetocaloric member, 12 fifth magnetic pole, 13 sixth magnetic pole, 14 seventh magnetic pole, 15 eighth magnetic pole, 16, 38 centered magnetic pole, 16A first surface, 16B second surface, 16C third surface, 16D fourth surface, 16E fifth surface, 16F sixth surface, 16G seventh surface, 16H eighth surface, 17A fifth gap, 17B sixth gap, 17C seventh gap, 17D eighth gap, 18A third coil, 18B fourth coil, 19A fifth coil, 19B sixth coil, 20A fifth pipe, 20B sixth pipe, 20C seventh pipe, 20D eighth pipe, 21A fifth magnetocaloric member, 21B sixth magnetocaloric member, 21C seventh magnetocaloric member, 21D eighth magnetocaloric member, 22B ninth magnetic pole, 22C tenth magnetic pole, 23, 23A ninth gap, 23B tenth gap, 24A seventh coil, 24B eighth coil, 25 ninth pipe, 26 ninth magnetocaloric member, 27 eleventh magnetic pole, 32, 33, 34, 35, 36, 37 magnetic pole, 100, 101, 102, 103, 104,105, 106, 107, 108 electromagnet for magnetic refrigeration, 111, 111A first heat exchanger, 111B third heat exchanger, 112, 112A, second heat exchanger, 112B fourth heat exchanger, 113 pump, 113A first pump, 113B second pump, 114 power source, 121, 122, inflow/outflow pipe, 121A, 121B, 121C, 121D, 122A, 122B, 122C, 122D, pipe portion, 200, 201, magnetic refrigerator.

The invention claimed is:

1. A magnetic refrigerator comprising:
   an electromagnet for magnetic refrigeration, the electromagnet for magnetic refrigeration including:
      a return yoke;
      at least one pair of opposite magnetic poles disposed inside the return yoke and spaced from each other by a gap;
      a pipe disposed in the gap to pass a heat transport medium therethrough;
      a magnetocaloric member disposed inside the pipe to exchange heat with the heat transport medium; and
      a coil energized to generate a magnetic flux passing across the gap,
   wherein the at least one pair of opposite magnetic Doles includes a first magnetic pole and a second magnetic pole disposed inside the return yoke and spaced from each other in a first direction by a first gap, and a third magnetic pole and a fourth magnetic pole disposed inside the return yoke and spaced from each other in the first direction by a second gap,
   the first magnetic pole is spaced from the third magnetic pole in a second direction by a third gap, the second direction intersecting the first direction,
   the second magnetic pole is spaced from the fourth magnetic pole in the second direction by a fourth gap, the pipe includes:
a first pipe disposed in the first gap to pass a heat transport medium therethrough,
a second pipe disposed in the second gap to pass a heat transport medium therethrough,
a third pipe disposed in the third gap to pass a heat transport medium therethrough, and
a fourth pipe disposed in the fourth gap to pass a heat transport medium therethrough,
the magnetocaloric member is disposed inside each of the first, second, third, and fourth pipes, and
the coil includes:
a first coil energized to generate a magnetic flux passing across two gaps of the first second, third, and fourth gaps, and
a second coil energized to generate a magnetic flux passing across the other two gaps of the first, second, third, and fourth gaps.

2. The magnetic refrigerator according to claim 1, wherein
there is a center gap inside the return yoke between the first and fourth magnetic poles and between the second and third magnetic poles,
the first and second gaps sandwich the center gap in the second direction, and
the third and fourth gaps sandwich the center gap in the first direction.

3. The magnetic refrigerator according to claim 2, wherein
the first coil surrounds the first and second gaps in the second direction,
the second coil surrounds the third and fourth gaps in the first direction,
the first and second coils are alternately energized,
when the first coil is energized the first coil generates a magnetic flux passing across the first gap and a magnetic flux passing across the second gap, and
when the second coil is energized the second coil generates a magnetic flux passing across the third gap and a magnetic flux passing across the fourth gap.

4. The magnetic refrigerator according to claim 2, wherein
the first coil surrounds the first magnetic pole,
the second coil surrounds the second magnetic pole,
the first and second coils are concurrently energized or concurrently unenergized, and
when the first and second coils are energized the first and second coils generate a magnetic flux passing across the first and fourth gaps and a magnetic flux passing across the second and third gaps.

5. The magnetic refrigerator according to claim 2, wherein a spacing of the first and second gaps in the first direction and a spacing of the third and fourth gaps in the second direction are smaller than a width of the first and second coils in a direction along their respective central axes.

6. The magnetic refrigerator according to claim 2, further comprising:
a first heat exchanger connected to one end of the pipe of the electromagnet for magnetic refrigeration; and
a second heat exchanger connected to another end of the pipe of the electromagnet for magnetic refrigeration.

7. The magnetic refrigerator according to claim 1, wherein
the first coil surrounds the first and second gaps in the second direction,
the second coil surrounds the third and fourth gaps in the first direction,
the first and second coils are alternately energized,
when the first coil is energized the first coil generates a magnetic flux passing across the first gap and a magnetic flux passing across the second gap, and
when the second coil is energized the second coil generates a magnetic flux passing across the third gap and a magnetic flux passing across the fourth gap.

8. The magnetic refrigerator according to claim 7, wherein a spacing of the first and second gaps in the first direction and a spacing of the third and fourth gaps in the second direction are smaller than a width of the first and second coils in a direction along their respective central axes.

9. The magnetic refrigerator according to claim 7, further comprising:
a first heat exchanger connected to one end of the pipe of the electromagnet for magnetic refrigeration; and
a second heat exchanger connected to another end of the pipe of the electromagnet for magnetic refrigeration.

10. The magnetic refrigerator according to claim 1, wherein
the first coil surrounds the first magnetic pole,
the second coil surrounds the second magnetic pole,
the first and second coils are concurrently energized or concurrently unenergized, and
when the first and second coils are energized the first and second coils generate a magnetic flux passing across the first and fourth gaps and a magnetic flux passing across the second and third gaps.

11. The magnetic refrigerator according to claim 10, wherein a spacing of the first and second gaps in the first direction and a spacing of the third and fourth gaps in the second direction are smaller than a width of the first and second coils in a direction along their respective central axes.

12. The magnetic refrigerator according to claim 10, further comprising:
a first heat exchanger connected to one end of the pipe of the electromagnet for magnetic refrigeration; and
a second heat exchanger connected to another end of the pipe of the electromagnet for magnetic refrigeration.

13. The magnetic refrigerator according to claim 1, wherein a spacing of the first and second gaps in the first direction and a spacing of the third and fourth gaps in the second direction are smaller than a width of the first and second coils in a direction along their respective central axes.

14. The magnetic refrigerator according to claim 13, further comprising:
a first heat exchanger connected to one end of the pipe of the electromagnet for magnetic refrigeration; and
a second heat exchanger connected to another end of the pipe of the electromagnet for magnetic refrigeration.

15. The magnetic refrigerator according to claim 1, further comprising:
a first heat exchanger connected to one end of the pipe of the electromagnet for magnetic refrigeration; and
a second heat exchanger connected to another end of the pipe of the electromagnet for magnetic refrigeration.

16. A magnetic refrigerator comprising:
an electromagnet for magnetic refrigeration, the electromagnet for magnetic refrigeration including:
a return yoke;

at least one pair of opposite magnetic poles disposed inside the return yoke and spaced from each other by a gap;
a pipe disposed in the gap to pass a heat transport medium therethrough;
a magnetocaloric member disposed inside the pipe to exchange heat with the heat transport medium; and
a coil energized to generate a magnetic flux passing across the gap,
wherein the at least one pair of opposite magnetic poles includes a centered magnetic pole disposed inside the return yoke at a center in a third direction and a fourth direction intersecting the third direction, a fifth magnetic pole and a sixth magnetic pole disposed inside the return yoke so as to sandwich the centered magnetic pole in the third direction, and a seventh magnetic pole and an eighth magnetic pole disposed inside the return yoke so as to sandwich the centered magnetic pole in the fourth direction,
the centered magnetic pole is spaced from the fifth magnetic pole in the third direction by a fifth gap,
the centered magnetic pole is spaced from the sixth magnetic pole in the third direction by a sixth gap,
the centered magnetic pole is spaced from the seventh magnetic pole in the fourth direction by a seventh gap, and
the centered magnetic pole is spaced from the eighth magnetic pole in the fourth direction by an eighth gap,
the pipe includes:
  a fifth pipe disposed in the fifth gap to pass a heat transport medium therethrough,
  a sixth pipe disposed in the sixth gap to pass a heat transport medium therethrough,
  a seventh pipe disposed in the seventh gap to pass a heat transport medium therethrough, and
  an eighth pipe disposed in the eighth gap to pass a heat transport medium therethrough,
the magnetocaloric member is disposed inside each of the fifth, sixth, seventh, and eighth pipes, and
the coil includes:
  a third coil disposed so as to surround the fifth magnetic pole in the fourth direction,
  a fourth coil disposed so as to surround the sixth magnetic pole in the fourth direction,
  a fifth coil disposed so as to surround the seventh magnetic pole in the third direction, and
  a sixth coil disposed so as to surround the eighth magnetic pole in the third direction.

17. The magnetic refrigerator according to claim 16, wherein the centered magnetic pole has:
  a first surface extending in the fourth direction and facing the fifth gap;
  a second surface extending in the fourth direction and facing the sixth gap;
  a third surface extending in the third direction and facing the seventh gap; and
  a fourth surface extending in the third direction and facing the eighth gap.

18. The magnetic refrigerator according to claim 16, wherein the centered magnetic pole has:
  a fifth surface extending in a fifth direction intersecting each of the third and fourth directions, and facing each of a portion of the fifth gap and a portion of the seventh gap;
  a sixth surface extending in the fifth direction and facing each of a portion of the sixth gap and a portion of the eighth gap;
  a seventh surface extending in a direction intersecting the fifth surface, and facing each of a remainder of the sixth gap and a remainder of the seventh gap; and
  an eighth surface extending in a direction intersecting the sixth surface, and facing a remainder of the fifth gap and a remainder of the eighth gap.

19. A magnetic efrigerator comprising:
an electromagnet for magnetic refrigeration, the electromagnet for magnetic refrigeration including:
  a return yoke;
  at least one pair of opposite magnetic poles disposed inside the return yoke and spaced from each other by a gap;
  a pipe disposed in the gap to pass a heat transport medium therethrough;
  a magnetocaloric member disposed inside the pipe to exchange heat with the heat transport medium; and
  a coil energized to generate a magnetic flux passing across the gap,
wherein the gap has a longitudinal direction and a shorter-side direction inclined with respect to a central axis of the coil.

* * * * *